US011896872B2

(12) United States Patent
Quast et al.

(10) Patent No.: US 11,896,872 B2
(45) Date of Patent: *Feb. 13, 2024

(54) AUTOMATIC TRIMMING AND CLASSIFICATION OF ACTIVITY DATA

(71) Applicant: Under Armour, Inc., Baltimore, MD (US)

(72) Inventors: William Quast, Austin, TX (US); Julia Lu, Austin, TX (US); Suraj Bhattarai, Austin, TX (US); Kaitlyn Carpenter, Austin, TX (US); Brian Lewis, Austin, TX (US); Christopher Peters, Austin, TX (US)

(73) Assignee: Under Armour, Inc., Baltimore, MD (US)

(*) Notice: Subject to any disclaimer, the term of this patent is extended or adjusted under 35 U.S.C. 154(b) by 56 days.

This patent is subject to a terminal disclaimer.

(21) Appl. No.: 17/180,744

(22) Filed: Feb. 20, 2021

(65) Prior Publication Data

US 2021/0170233 A1 Jun. 10, 2021

Related U.S. Application Data

(63) Continuation of application No. 15/851,202, filed on Dec. 21, 2017, now Pat. No. 10,926,137.

(51) Int. Cl.
*A63B 24/00* (2006.01)
*A63B 1/00* (2006.01)
*G06V 40/20* (2022.01)

(52) U.S. Cl.
CPC ............ *A63B 24/0075* (2013.01); *A63B 1/00* (2013.01); *G06V 40/25* (2022.01);
(Continued)

(58) Field of Classification Search
CPC .............. A63B 1/00; A63B 2024/0065; A63B 2024/0068; A63B 2220/12; A63B 24/0075; G06K 9/00342; G06K 9/00348
See application file for complete search history.

(56) References Cited

U.S. PATENT DOCUMENTS 8,109,858 B2 2/2012 Redmann
8,200,323 B2 6/2012 DeBenedetto
(Continued)

FOREIGN PATENT DOCUMENTS

JP 2007000357 A 11/2007

OTHER PUBLICATIONS

Koskimaki, H. and Siirtola, P., Recognizing Gym Exercises Using Acceleration Data from Wearable Sensors, Computer Science and Engineering Department, 2014, University of Oulu, Oulu, Finland.
(Continued)

*Primary Examiner* — Kyle R Quigley
(74) *Attorney, Agent, or Firm* — Maginot, Moore & Beck, LLP

(57) ABSTRACT

A system and method for automatically trimming and reclassifying workout data is disclosed. The system receives data associated with a workout of a user from at least one sensor associated with the user, the workout being classified as a first type of workout. The system processes the data to identify at least one time interval during the workout that does not correspond to the first workout type. The system prompts the user to select whether to remove or reclassify a subset of the data that is associated with the identified time interval. If the user chooses to do so, the system removes or reclassifies the subset of the data that is associated with the identified time interval. The system generates and provides
(Continued)

workout depictions using the data, at least one of which illustrates only the remaining data that was not removed or reclassified.

15 Claims, 15 Drawing Sheets

(52) U.S. Cl.
CPC .............. *A63B 2024/0065* (2013.01); *A63B 2024/0068* (2013.01); *A63B 2220/12* (2013.01)

(56) References Cited

U.S. PATENT DOCUMENTS

| | | | |
|---|---|---|---|
| 8,548,770 | B2 | 10/2013 | Yuen et al. |
| 2010/0204016 | A1 | 8/2010 | Chiu et al. |
| 2010/0305480 | A1 | 12/2010 | Fu et al. |
| 2013/0190903 | A1 | 7/2013 | Balakrishnan et al. |
| 2014/0278230 | A1* | 9/2014 | Rottler .................. G06F 15/00 702/160 |
| 2016/0358504 | A1* | 12/2016 | Powch .................. G09B 5/02 |
| 2017/0232294 | A1 | 8/2017 | Kruger et al. |
| 2018/0279916 | A1* | 10/2018 | Folland ................. A61B 5/486 |

OTHER PUBLICATIONS

Pernek, I. et al., Exercise Repetition Detection for Resistance Training Based on Smartphones, Personal and Ubiquitous Computing, Apr. 2013, vol. 17, Issue 4, Springer.

Chang, Keng-Hao et al., Tracking Free-Weight Exercises, 9th International Conference on Ubiquitous Computing, LNCS 4717, 2007, pp. 19-37, Springer-Verlag, Berlin, Heidelberg.

Normal distribution, Wikipedia, Sep. 28, 2011 (Year: 2011).

* cited by examiner

AUTOMATIC TRIMMING AND CLASSIFICATION OF ACTIVITY DATA

CROSS-REFERENCE TO RELATED APPLICATIONS

This patent document is a continuation of U.S. patent application Ser. No. 15/851,202, filed Dec. 21, 2017, now U.S. Pat. No. 10,926,137, issued Feb. 23, 2021, the entire contents of which are incorporated by reference herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD

The device and method disclosed in fitness tracking systems and, more particularly, to automatic trimming and classification of activity data using a fitness tracking system.

BACKGROUND

Activity tracking devices are increasingly utilized by individuals interested in tracking metrics related to their personal health and fitness activity. These activity tracking devices include, for example, heart rate monitors, step counters, stair counters, global positioning system ("GPS") tracking devices, as well as various other motion and biometric tracking devices. Many tracking devices require that user manually choose an activity or workout to track (e.g. a run), and then require the user to manually start and stop tracking of the activity or workout. However, experienced users know that, for many types of workouts, it is advantageous to warm up beforehand and to cool down afterward. Additionally, a user may take breaks during a workout in order to rest or rehydrate.

If the user wants track only the workout of interest (e.g., a run), the user must remember to start tracking the workout after warming up, pause the tracking of the workout during breaks, and stop tracking the workout before cooling down. Many users may find this process to be disruptive to their workout or may simply forget to start, pause, or stop the tracking of the workout. Accordingly, users may opt to simply start tracking the workout prior to warming up and stop tracking the workout after cooling down. As a result, the workout data includes portions of data that do not correspond to the workout of interest, which reduces the accuracy of certain performance metrics, such as an average pace of a run. In view of the foregoing, it would be advantageous to provide a method of automatically processing workout data to make the activity tracking devices easier to use and improve the relevancy of tracked workout data.

SUMMARY

In accordance with one exemplary embodiment of the disclosures, a method of displaying workout data is disclosed. The method comprises receiving data associated to a workout from at least one health parameter monitoring device having one or more biometric sensors and being associated to a user, wherein the data associated to the workout includes first data associated with a first time interval, second data associated with a second time interval following the first time interval, and third data associated with a third time interval following the second time interval. The method further comprises automatically identifying the second data as a subset of data to be removed from the data associated to the workout to create trimmed data, the trimmed data including both the first data and the third data and excluding the second data. Additionally, the method comprises generating a workout depiction including both the subset of data and the trimmed data, the workout depiction displaying at least one time-series performance metric relating to the workout, and providing the workout depiction to a display device for display thereat.

Pursuant to another exemplary embodiment of the disclosures, a computer readable medium comprising a plurality of instructions is disclosed. The plurality of instructions are configured to, when executed, cause a processor to: (i) receive a plurality of data associated to a workout performed by a user, the plurality of data being classified as corresponding to a particular type of workout activity, wherein the data associated to the workout includes first data collected during the particular type of workout activity and second data collected during a pause or a break in the particular type of workout activity; (ii) process the plurality of data to identify that the second data does not correspond to the particular type of workout activity; (iii) prompt the user to select whether to reclassify the second data; (iv) reclassify the second data as a second type of activity that is different than the particular type of workout, in response to the user selecting to reclassify the second data; (v) generate a first workout depiction including the first data that remains classified as the particular type of workout and excluding the second data that was reclassified classified as the second type of activity; and (vi) provide the first workout depiction to a display device for display to the user.

In accordance with yet another exemplary embodiment, an apparatus for workout editing is disclosed. The apparatus comprises: (i) a transceiver apparatus configured to enable communication with at least one health parameter monitoring apparatus; (ii) a user interface configured to provide an interactive display to a user; (iii) a storage entity; and (iv) a processor configured to communicate to the storage entity and the at least one interface. The processor is configured to execute at least one health-monitoring application program thereon, the health-monitoring application program comprising a plurality of instructions which are configured to, when executed by the processor, cause the apparatus to: (a) receive a plurality of health parameter data associated to a workout from the at least one health parameter monitoring apparatus via the transceiver apparatus, wherein the health parameter data includes first data associated with a first time interval and second data associated with a second time interval; (b) automatically identify the second data as a subset of the plurality of health parameter data to be removed or reclassified in association with said workout; (c) generate a first workout depiction including the first data of the plurality of health parameter data that was not removed or reclassified and excluding the subset that was removed or reclassified; (d) generate a second workout depiction including both the first data that was not removed or reclassified and the subset that was removed or reclassified; and (e) cause the user interface to simultaneously display the first workout depiction and the second workout depiction.

These and other aspects of the disclosure will become evident given the discussion provided herein.

BRIEF DESCRIPTION OF THE DRAWINGS

The foregoing aspects and other features of a fitness tracking system are explained in the following description, taken in connection with the accompanying drawings.

All Figures ©Under Armour, Inc. 2017-2018. All rights reserved.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

Figure 1:
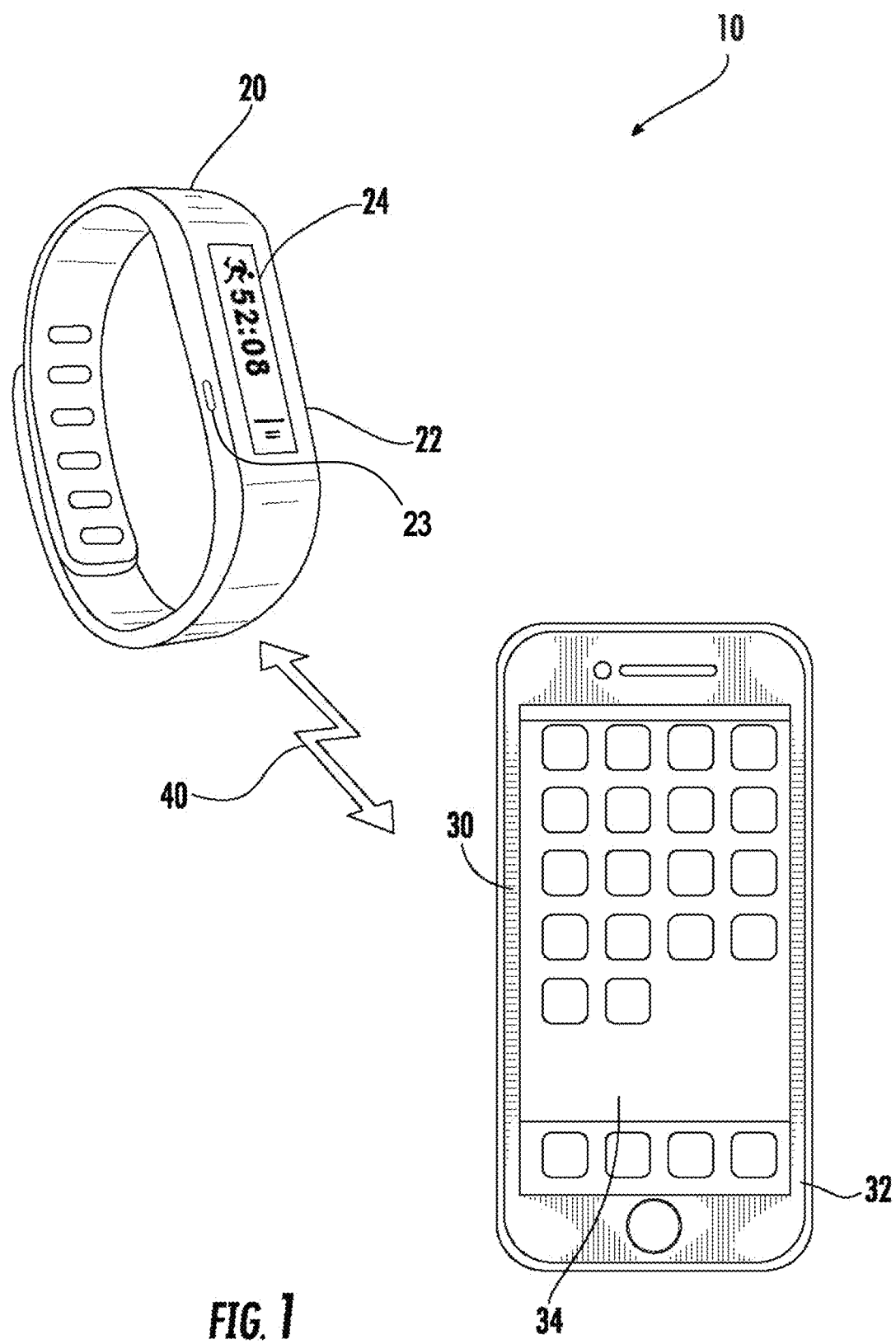
FIG. 1 is a diagrammatic view showing an exemplary embodiment of a fitness tracking system including an activity monitoring device and an electronic display device.
Figure 2:
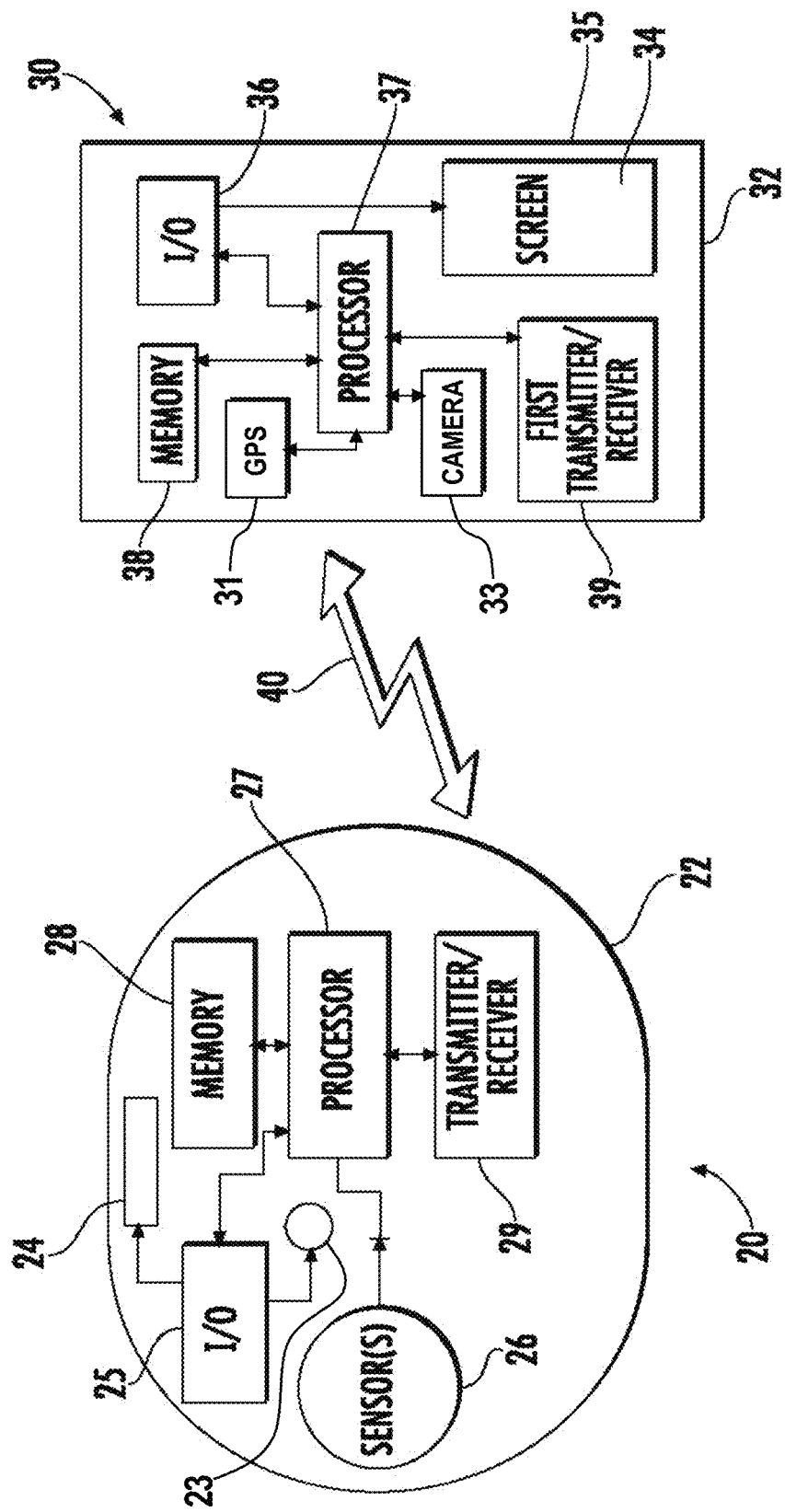
FIG. 2 is a block diagram of exemplary electronic components in the activity monitoring device and the electronic display device of the fitness tracking system of FIG. 1.

With reference to FIGS. 1-2, an exemplary embodiment of a fitness tracking system 10 for recording fitness data during an activity or workout (which may also be referred to herein as the "health tracking system" or the "activity tracking system"). In one embodiment, the fitness tracking system 10 includes at least one activity monitoring device 20 and at least one electronic display device 30 in communication therewith. The activity monitoring device 20 is a user device configured to measure one or more health and fitness parameters of a user during an activity or workout and provide fitness data regarding the activity or workout to the electronic display device 30. In many embodiments, the activity monitoring device 20 is designed and dimensioned to be worn on or carried by the body of a user. However, the activity monitoring device 20 may also be a designed and dimensioned to be attached to or integrated with certain mobile fitness equipment, such as bicycles, roller blades, skateboards, scooters, or the like. In some embodiments, the fitness tracking system 10 includes more than one activity monitoring device 20 associated with the individual user. The electronic display device 30 is a user device designed to process the fitness data and display it to the user in a format that summarize a user's performance during an activity or workout. In some embodiments, the electronic display device 30 may also collect fitness data independently of any dedicated activity monitoring devices 20 and, in this way, may function as the activity monitoring device 20 or as one of the activity monitoring devices 20.

The term "fitness data" as used herein refers to data relating to a user's fitness and performance during an activity or workout, but also data regarding the user's health and general well-being outside of the activity or workout, and may also be referred to herein as "fitness information" or "fitness parameters." Fitness data may include activity data, physiological data, and performance perception data. Fitness data may be in a raw measured form or in a processed form. Fitness data may be automatically measured, sensed, or collected by the activity monitoring device 20 and/or the electronic display device 30, but may also be entered manually by the user via the activity monitoring device 20 and/or the electronic display device 30. The term "activity data" as used herein is a subset of fitness data, and refers to data related to physical activity (i.e., movement or lack thereof) of the user. Examples of activity data include body motion/acceleration data, step data, stride length data, distance traversal data, pace/speed data, altitude data, environmental/positional data (such that provided by a GPS receiver), exercise weight/resistance data, exercise repetition data, and/or any of various other types of personal activity metrics that may be relevant the user's physical activity for a given period of time. The term "physiological data" as used herein is a subset of fitness data, and refers to data related to the physiological status and health of the user. Examples of physiological data include age, gender, height, body weight, body fat, heart rate, aspiration rate, blood oxygenation, blood glucose, hydration, caloric expenditure, or any of various other types of physiological metrics that may be relevant the user's physiological health for a given period of time. The term "performance perception data" as used herein is a subset of fitness data, and refers to data related a personal feeling or subjective perception of one's own performance or physical-fitness as determined by the user himself or herself based on the user's own senses, feelings, awareness, mental impressions, and/or other perceptions of the user. Performance perception data may broadly relate the user's perception of his or her overall performance generally or his or her overall performance during a particular activity or workout, but may also relate to the user's perception of particular aspects of his or her performance, such as the user's perception of his or her time, pace, distance, calories burned, and/or any of the fitness parameters discussed above.

While the activity monitoring device 20 is described herein as the primary device for collecting and transmitting fitness data to the electronic display device 30, it will be recognized that additional data may also be collected or otherwise obtained and/or input in to the electronic display device 30 via various other mechanisms. In at least one embodiment, the user may manually input data directly into the activity monitoring device 20 and/or the electronic display device 30. For example, the user may manually collect exercise weight/resistance data or exercise repetition data and input such data into the activity monitoring device 20 and/or the electronic display device 30 without the use of a sensor and/or other device for transmitting the fitness data to the electronic display device 30.

In the instance in which a user utilizes one or more activity monitoring devices 20, fitness data from each device 20 is delivered to the electronic display device 30. As represented by the arrow 40 in FIGS. 1 and 2, the one or more activity monitoring devices 20 are configured to transmit a wireless RF signal representative of the fitness data collected or obtained thereat to at least one display device 30. In addition, the fitness data may also be transmitted to additional computing devices, such as a watch, personal computer, and/or a laptop computer where the fitness data may be conveniently displayed for the user. In other embodiments, a wired connection may be utilized for communication of fitness data between the electronic display device 30 and the activity monitoring device 20. Similarly, in another embodiment, the fitness data may be transmitted from the activity monitoring devices 20 and/or the display device 30 to the aforementioned network server (not shown). The data may then be accessed by the user at any number of additional computerized devices via a username and password, or other form of identification and authentication of the user.

Although not illustrated, in one embodiment, the activity monitoring device 20 and electronic display device 30 may communicate via a network to a network-side database and/or remote server (not shown) for storage and/or processing of the fitness data, thereby decreasing the processing capacity required at either user device (e.g., the activity monitoring device 20 or electronic display device 30).

In at least one embodiment, the transmission of data from the activity monitoring device 20 to the electronic display device 30 (or to the network server (not shown)) occurs automatically without requiring the user to prompt or initiate the transmission. In another embodiment, the activity monitoring device 20 may be configured to begin transmissions once it receives a confirmation that the electronic display device 30 is within an appropriate range of the activity monitoring device 20. In yet another embodiment, data transmission may occur periodically at predetermined intervals of time. In other embodiments, where communications between the activity monitoring device 20 and the electronic display device 30 are made with a wired connection, communications only occur when the wired connection is established between the activity monitoring device 20 and the electronic display device 30. Similar logic applies to the transmission of data from the activity monitoring device 20 and/or the electronic display device 30 to the network server (not shown).

In the embodiment disclosed herein, the activity monitoring device 20 is shown as being a completely separate unit from the electronic display device 30. However, in at least one embodiment, the activity monitoring device 20 and the electronic display device 30 are provided as a single unit. For example, the activity monitoring device 20 and the electronic display device 30 may be provided as part of a mobile phone, so-called "smart" watch or other personal electronic device. In such embodiments, duplicative hardware described below can be combined and/or eliminated. Additionally, while a single activity monitoring device 20 is shown in the embodiment of FIG. 1, it will be recognized that multiple activity monitoring devices 20 may be used by a single user, each of the activity monitoring device 20 configured for communication with the electronic display device 30. An exemplary activity monitoring device 20 and an exemplary electronic display device 30 will be discussed in further detail below.

Activity Monitoring Device

With continued reference to FIGS. 1-2, the activity monitoring device 20 (which may also be referred to herein as a "activity tracking device", or a "sensor device") may be provided in any of various forms and is configured to measure, collect and/or otherwise obtain any of the various types of fitness data (as discussed above). The fitness data accumulated during an activity or workout may be collected automatically by a sensor of the activity monitoring device 20, via manual entry by the user, and/or collected by any of various other means. In at least one embodiment, the activity monitoring device 20 is an activity tracker configured to measure one or more of steps taken (including walking or running), distance traversed, stairs climbed, heart rate, as well as various other types of activity data or physiological data (such "activity trackers" are commonly also referred to as "fitness trackers").

In one exemplary embodiment the activity monitoring device 20 is configured to be worn or carried by the human user. For example, in the embodiment shown in FIG. 1, the activity monitoring device 20 is provided as a wrist band that the user straps to his or her wrist. However, it will be recognized that in other embodiments, the activity monitoring device 20 may be provided in any of various different configurations to be worn on any of various locations on the body of the user, such as via a module that clips on to clothing, is worn on a chest strap, fits in a pocket of the user, and/or is incorporated into a garment or a shoe. Alternatively, the activity monitoring device 20 may be configured so as to be fixed to or integrated with mobile fitness equipment, such as in the case of a bicycle speed, power, and/or cadence sensor device. Additional examples of configurations for the activity monitoring device 20 include configurations where the sensor device is provided as a component of a multi-function device, such as a watch, a mobile phone or other personal electronic device. Additional or alternative examples of activity monitoring devices 20 include those sold under the trademarks FITBIT®, JAWBONE®, POLAR®, SAMSUNG®, APPLE® and UNDER ARMOUR®.

With continued reference to the embodiment of FIGS. 1 and 2, the activity monitoring device 20 includes a protective outer shell or housing 22 designed to retain and protect various sensors and other electronic components positioned within the housing 22. The housing 22 comprise any number of shapes, configurations, and/or materials, the description herein being merely exemplary. In at least one embodiment, the housing 22 includes a relatively rigid portion that securely retains the electronic components, and a more resilient portion which functions as an outer layer to provide shock absorption features in the event the activity monitoring device 20 is dropped, falls, or otherwise withstands an amount of force. The activity monitoring device 20 and housing 22 may be configured to be worn or otherwise carried by the user in any of a number of ways. For example, the housing 22 of the activity monitoring device 20 may be provided as part of a chest or wrist strap having an associated clasp, or may include a clip or other arrangement that allows the activity monitoring device 20 to be coupled to the clothing of the user (as discussed elsewhere herein). In other embodiments, the housing 22 is configured to attach the activity monitoring device 20 to a body of a bicycle or other mobile fitness equipment.

The activity monitoring device 20 may also include other features visible on the housing 22 such a button 23, a display 24, one or more connection ports (not shown), or other input/output hardware and software that operate in conjunction with an I/O interface 25. In the embodiment shown, the button 23 comprises a tactile button, switch, and/or toggle. However, in other embodiments, the button 23 may also comprise capacitive or resistive touch sensor. The display 24 may vary based on the type of device. For example, in the embodiment shown, the display 24 comprises an LCD or LED screen that provides performance metric information (e.g., time, distance, pace, heart rate, progress toward a goal, or some combination thereof, etc.), notifications, text messages, caller ID, etc. to the user. In some embodiments, the display 24 is a touch screen display that allows the user to provide inputs to the I/O interface 25 via virtual buttons or other interfaces on the touch screen. Alternatively, in one embodiment, the display 24 may simply be one or more colored lights and/or flashing patterns configured to communicate information to the user (e.g., progress towards a goal or other performance metric). The connection ports may be used to connect the activity monitoring device 20 to a power source or to share data with other electronic devices.

As shown in FIG. 2, the activity monitoring device 20 includes electronic circuitry comprising, the I/O interface 25, one or more sensors 26 (optional), a processor 27, a memory 28, and the transmitter/receiver 29. The activity monitoring device 20 also includes a battery or other power source (not shown) configured to power the various electronic devices within the activity monitoring device 20. In at least one embodiment, the battery of the activity monitoring device 20 is a rechargeable battery. In this embodiment, the activity monitoring device 20 may be placed in or connected to a battery charger configured for use with the activity monitoring device 20 in order to recharge the battery.

In one embodiment, the activity monitoring device 20 comprises one or more sensors 26. The sensors 26 may comprise any of various devices configured to collect the activity or physiological data, including step data, motion data, distance traversal data, pace data, GPS data, altitude data, heart rate data, breathing data, environmental/positional data, and/or any of various other types of fitness data that may be relevant to determining activities of the wearer. In at least one embodiment, the sensors 26 include a 3-axis accelerometer configured to detect the motions of the wearer during walking, running, bicycling, swimming, or the like. Of course, it will be recognized by those of ordinary skill in the art that numerous other sensors may be used, depending on the type of activity the activity monitoring device 20 is designed to detect.

With continued reference to FIG. 2, the processor 27 may be any of various microprocessors as will be recognized by those of ordinary skill in the art. The processor 27 is configured to receive data signals from the sensors 26, and other component parts of the activity monitoring device 20 (such as data entered via the I/O interface 25), and process such signals. The processor 27 is connected to the memory 28 and the transmitter/receiver 29, and may deliver processed data to one or both of the memory 28 and the transmitter/receiver 29. Additionally, the processor 27 may perform some processing on the received data prior to delivery thereof to the memory 28 or transmitter/receiver 29. For example, the processor 27 may associate the fitness data with a particular time, day, user (in the instance that the device is configured to collect data relating to more than one user), and/or event. The processor 27 is also connected to the I/O interface 25, and may send signals to the I/O interface 25 which results in illumination of the display 24 in order to provide text and/or image based messages or otherwise communicate to the user.

The memory 28 is configured to store information, including both data and instructions. The data may be retrieved from the processor 27 and generally includes fitness data, but may also include various types of operational data that may be ancillary to the basic operation of the activity monitoring device 20. The instructions which are stored at the memory 28 generally include firmware and/or software for execution by the processor 27, such as a program that controls the settings for the sensor device, a program that controls the output of the display 24 on the activity monitoring device 20, a program that controls the receipt of information via the sensor 26, a program that controls the transmission and reception of data via the transmitter/receiver 29, as well as any of various other programs that may be associated with the activity monitoring device 20. Such instructions may be present on the device 20 at the time of manufacture or may be downloaded thereto via well-known mechanisms. The memory 28 may be of any type capable of storing information accessible by the processor 27, such as a memory card, ROM, RAM, write-capable, read-only memories, or other computer-readable medium. The data may be stored in the memory 28 in a relational database as a table having a plurality of different fields and records, XML documents, or flat files. The data may also be formatted in any computer-readable format such as, but not limited to, binary values, ASCII or Unicode.

The transmitter/receiver 29 in one embodiment comprises an RF transmitter and receiver configured to transmit and receive communications signals over a short range using a wireless communications technology, such as Wi-Fi or Bluetooth®, using any of various communications protocols, such as TCP/IP. Such transmitter/receivers are well known and will be recognized by those of ordinary skill in the art. The transmitter/receiver 29 is particularly configured to communicate with the electronic display device 30 when the activity monitoring device 20 is within a given range of the electronic display device 30, and transmit collected fitness data to the electronic display device 30.

Electronic Display Device

With continued reference to FIGS. 1-2, the electronic display device 30 (also referred to herein as a "display device" or a "user device") generally includes an input/output interface 36, a processor 37, a memory 38, and a transmitter/receiver 39. Additionally, the electronic display device 30 also includes a battery or other power source (not shown) configured to power the electronic components within the electronic display device 30. In at least one embodiment, the electronic display device 30 is a handheld mobile computing device, such as a smartphone. While a smartphone has been shown as the electronic display device 30 in FIGS. 1 and 2, it will be appreciated that the electronic display device 30 may alternatively comprise any number of devices. For example, the electronic display device 30 may be a standalone device, such as a desktop PC, and/or smart television. Alternatively, the electronic display device 30 may be any type of portable or other personal electronic device such as a watch, tablet computer, laptop computer, and/or any of various other mobile computing devices. As will be recognized by those of ordinary skill in the art, the components of the electronic display device 30 may vary depending on the type of display device used. Such alternative display devices may include much (but not necessarily all) of the same functionality and components as the electronic display device 30 shown in FIGS. 1 and 2, as well as additional functionality or components necessary for proper functioning thereof (not shown).

The I/O interface 36 of the electronic display device 30 includes software and hardware configured to facilitate communications with the one or more activity monitoring devices 20 and/or communications to the user him/herself. The hardware includes a display screen 34 configured to visually display graphics, text, and other data to the user. The hardware may also include a microphone and/or speakers to facilitate audio communications with the user and/or verbal entry of commands to the device 30. In at least one embodiment, the display screen 34 is a touch screen display that allows the user to see data presented on the display screen 34 and input data into the electronic display device 30 via a virtual keyboard or other interface on the touch screen. However, other means for receiving user input, such as a physical keyboard, may also be provided with equal success.

The processor 37 of the electronic display device 30 may be any of various processors as will be recognized by those of ordinary skill in the art. The processor 37 is connected to the I/O interface 36, the memory 38, and the transmitter/receiver 39, and is configured to deliver data to and/or receive data from each of these components. It will be recognized by those of ordinary skill in the art that a "processor" as used herein includes any hardware system, hardware mechanism or hardware component that processes data, signals, and/or other information. A processor can include a system with a central processing unit, multiple processing units, dedicated circuitry for achieving functionality, and/or other systems.

The memory 38 is configured to store information, including both data and instructions. The data may be, for example, fitness data as discussed above, which may be related to the activities, workouts, health and fitness profile, etc. of the user, along with other operational data that may be ancillary to the basic operation of the electronic display device 30 and any applications retained on the electronic display device 30. The instructions which are stored at the memory 38 generally include firmware, an operating system, and/or other software for execution by the processor 37, such as one or more programs that control the settings for the electronic display device, one or more programs that control the output of the display 34 on the electronic display device 30, one or more programs that control various applications on the electronic display device 30, one or more programs that control the transmission and reception of data via the transmitter/receiver 39, as well as any of various other programs that may be associated with the electronic display device 30. In at least one embodiment, the instructions stored in the memory 38 include activity or workout tracking application, discussed in greater detail below, which is executed by the processor 37 to process fitness data and present the fitness data in a graphical format on the display screen 34. The memory 38 may be of any type of device capable of storing information accessible by the processor, such as a memory card, ROM, RAM, write-capable memories, read-only memories, hard drives, discs, flash memory, or any of various other computer-readable medium serving as data storage devices, as will be recognized by those of ordinary skill in the art.

The transmitter/receiver 39 is, in one embodiment, an RF transmitter and receiver configured to transmit and receive communications signals using a wireless communications technology, such as Wi-Fi or Bluetooth®, using any of various communications protocols, such as TCP/IP. Such transmitter/receivers are well known and will be recognized by those of ordinary skill in the art. The transmitter/receiver 39 is particularly configured to communicate with a transmitter/receiver 29 of the activity monitoring device 20. In at least one embodiment, the transmitter/receiver 39 is configured to allow the electronic display device 30 to communicate with a wireless telephony network, as will be recognized by those of ordinary skill in the art. The wireless telephony network may comprise any of several known or future network types. For example, the wireless telephony network may comprise commonly used cellular phone networks using CDMA or FDMA communications schemes. Some other examples of currently known wireless telephony networks include Wi-Fi, WiMax, GSM networks, as well as various other current or future wireless telecommunications arrangements.

As discussed above, in at least some embodiments, the electronic display device 30 also functions as one of the activity monitoring device 20 and collects certain fitness data independent dedicated activity monitoring devices 20. Particularly, in at least one embodiment, the electronic display device 30 includes a GPS receiver 31 configured to record a global position of the user during an activity or workout. Additionally, in some embodiments, the electronic display device 30 also includes sensors, such as a 3-axis accelerometer, altimeter, etc. (not shown), configured to record fitness data during an activity or workout.

In at least one embodiment, the electronic display device 30 includes a camera 33 having at least one photo-sensitive element configured to capture an image and/or video of the surroundings. The processor 37 is configured to operate the camera 33 to capture the image and/or video, to receive the image and/or video from the camera 33, and to store the image and/or video in the memory 38. A user may initiate capture of the image and/or video by pressing virtual buttons (not shown) on the display screen 34 or by pressing physical buttons (not shown) of the electronic display device 30.

The electronic display device 30 generally includes a protective outer shell or housing 32 designed to retain and protect the electronic components positioned within the housing 32. The housing 32 may comprise any number of shapes, configurations, and/or materials, the description herein being merely exemplary. In at least one embodiment, the housing 32 includes a relatively rigid portion that securely retains the electronic components, and a more resilient portion which functions as an outer layer to provide shock absorption features in the event the device 30 is dropped, falls, or otherwise withstands an amount of force. In embodiments wherein the electronic display device 30 also functions as one of the activity monitoring devices 20, the housing 32 may serve as a common housing for components of the electronic display device 30 and components of the activity monitoring device 20.

In at least one embodiment, the instructions stored in the memory 38 of the electronic display device 30 includes an activity tracking application (which may also be referred to herein as the "workout tracking application"), which is executed by the processor 37 to provide a graphical user interface that enables the user to track, view, and manage his or her fitness data. An exemplary activity tracking application will be discussed in further detail below.

Activity Tracking Application

The activity tracking application, stored in the memory 38 of the electronic display device 30, at least includes instructions for enabling a user to track a plurality of performance metrics during an activity or workout. Particularly, the activity tracking application includes instructions for collecting and processing fitness data during an activity or workout to provide various performance metrics to the user. The term "performance metric" as used herein refers to any standard of measurement relevant to an assessment of the performance, fitness, and health of the user during an activity or workout, or series of activities or workouts. In some cases, the raw measured fitness data is processed substantially to provide a performance metric, but in other cases, measured fitness data may simply be organized into a more presentable form to provide the performance metric. Performance metrics can be generally be considered a further type of fitness data, as defined above. Some examples of performance metrics include heart rate sensor data expressed as beats per minute during an activity or workout, acceleration data expressed a total number of steps during an activity or workout, GPS data expressed as a total distance traversed during an activity or workout, GPS data expressed as positions over time and/or a route/path of the user during an activity or workout, GPS data expressed as an speed/pace over time or average speed/pace during an activity or workout, GPS data or altimeter data expressed as an elevation over time during an activity or workout, fitness data expressed as an estimated number of calories burned, time data expressed a total amount of time spent during an activity or workout, and fitness data express as a total number of workouts or number of workouts during a particular time period (e.g., workouts per week). Further exemplary performance metrics may include any parameter of fitness data expressed as an average over a particular duration of time (e.g. the duration of the workout), as a data plot over the particular duration of time, as a maximum or minimum over the particular duration of time, as a value for some point in time of particular interest, or as a percentage of a user's health or fitness goal or other standard.

Figure 3:
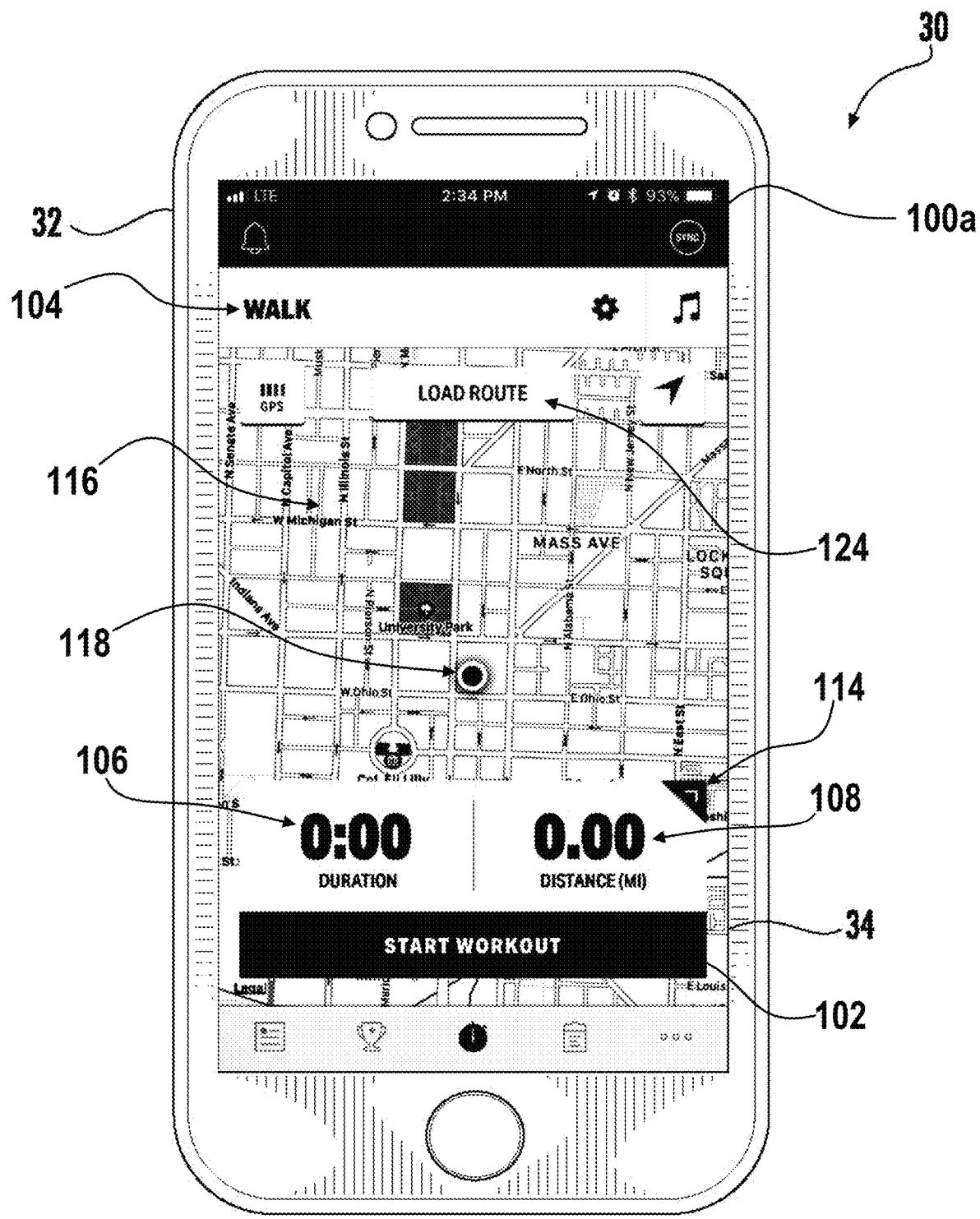
FIG. 3 is a plan view showing the electronic display device of the fitness tracking system of FIG. 1 displaying an activity tracking screen that enables a user to track performance metrics during a workout.

FIG. 3 shows an exemplary embodiment of an activity tracking screen 100a that is displayed on the display screen 34 of the electronic display device 30 to enable a user to track a plurality of performance metrics during an activity or workout. The processor 37 executes instructions of the activity tracking application stored in the memory 38 to display the activity tracking screen 100a on the display screen 34. The activity tracking screen 100a at least includes a start option 102 (e.g., "Start Workout") that enables the user of the electronic display device 30 to initiate collection of fitness data during an activity or workout. Particularly, in response to the user pressing the start option 102, the processor 37 is configured to initiate collection of fitness data by any sensors of the electronic display device 30, such as the GPS receiver 31 and/or initiate reception of fitness data from the activity monitoring devices 20. In some embodiments, the activity tracking screen 100a includes workout settings option 104 that, when pressed, causes the processor 37 to display an additional menu on the display screen 34 via which the user can choose a type of workout (e.g., walk, run, road cycling, mountain bike, etc.), as well as choose other settings for the workout (e.g., coaching, voice feedback, delay start timer, gear tracking, and other workout settings).

Figure 4:
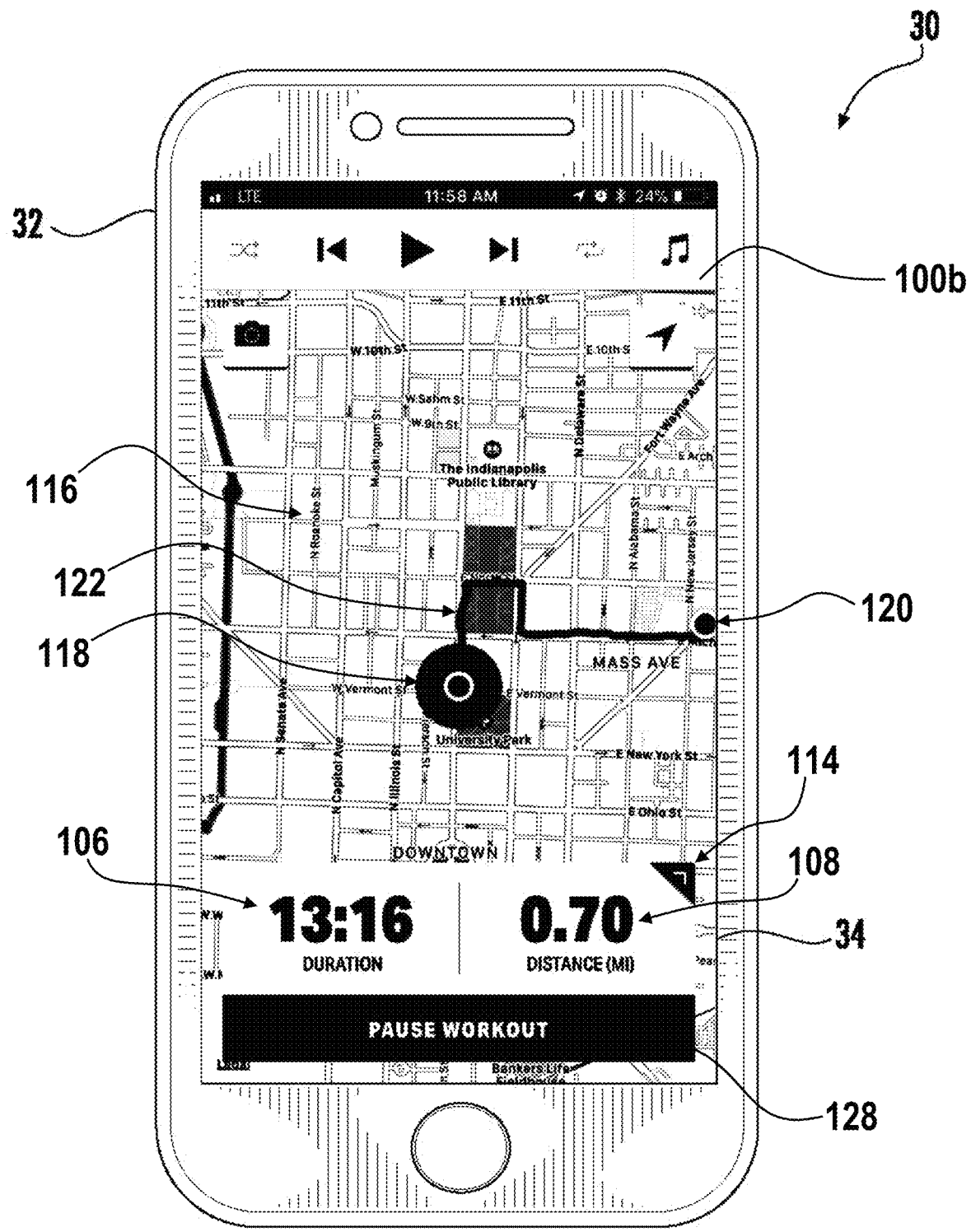
FIG. 4 is a plan view showing the electronic display device of the fitness tracking system of FIG. 1 displaying a real-time tracking screen that enables real-time viewing of certain performance metrics during the workout.

FIG. 4 shows an exemplary embodiment of a real-time tracking screen 100b that is displayed on the display screen 34 of the electronic display device 30 to enable to real-time viewing of certain performance metrics during the activity or workout. Particularly, in at least one embodiment, in response to the user pressing the start option 102 of the activity tracking screen 100a, the processor 37 executes instructions of the activity tracking application to display the real-time tracking screen 100b on the display screen 34, which is different from the activity tracking screen 100a. The real-time tracking screen 100b includes at least one performance metric that is displayed in real time during the activity or workout. Particularly, in the embodiment shown, the real-time tracking screen 100b includes performance metrics 106 and 108 (e.g., a "13:16" value for the "DURATION" performance metric and a "0.70" value for the "DISTANCE (MI)" performance metric). In one embodiment, the real-time tracking screen 100b further includes a expand button 114 that, when pressed by the user, causes the processor 37 to display an expanded view on the display screen 34 that shows values for additional performance metrics in real time during the activity or workout. Additionally, as shown in FIG. 3, the activity tracking screen 100a may also show the metrics 106 and 108 and the expand option 114.

Returning to FIG. 4, the real-time tracking screen 100b includes a map 116 of a geographical area surrounding the electronic display device 30. The processor 37 is configured to receive global position data from a GPS receiver of the electronic display device 30 or of an activity monitoring device 20 and overlay onto the map 116 in real time a current location 118, a starting location 120, and a route 122 for the current activity or workout. Additionally, as shown in FIG. 3, the activity tracking screen 100a may also show the map 116 and the current location 118. In some embodiments, the activity tracking screen 100a also includes a route option 124 that, when pressed, causes the processor 37 to display an additional menu on the display screen 34 via which the user can select a route for a previous workout. In response to a selection of the previous route, the processor 37 is configured to overlay the previous route (not shown) onto the map 116 of the real-time tracking screen 100b and/or the activity tracking screen 100a.

Finally, the real-time tracking screen 100b includes a pause/end option 128 which enables the user to pause and end tracking of the plurality of performance metrics during the activity or workout. In one embodiment, in response to the user pressing the pause/end option 128, the processor 37 stops collecting fitness data and displays a menu (not shown) on the display screen 34 from which the user can either resume the tracking the workout or end the workout. In at least one embodiment, once the user has ended the workout, the processor 37 is configured to perform additional processing of the collected fitness data to provide additional performance metrics to the user.

In addition to the screens 100a and 100b, which are shown on the display screen 34 of the electronic display device 30, in some embodiments, the user can interact with the activity tracking application via an interface of the activity monitoring device 20. Particularly, in at least one embodiment, the user can start and stop the tracking of the activity or workout using an interface of the activity monitoring device 20. In one embodiment, the user can press the button 23 of the activity monitoring device 20 to begin tracking a workout. More particularly, in response to the user pressing the button 23, the processor 27 is configured to initiate collection of fitness data by the sensors 26 of the activity monitoring devices 20 and, optionally, transmit a start command to the electronic display device 30 using the transmitter/receiver 29. In response to receiving the start command, the processor 37 of the electronic display device 30 is configured to initiate collection of fitness data by any sensors of the electronic display device 30, such as the GPS receiver 31 and/or initiate reception of fitness data from other activity monitoring devices 20. Similarly, the user can press the button 23 of the activity monitoring device 20 to end and/or pause tracking of the workout. Particularly, in response to the user pressing the button 23 again, the processor 27 is configured to stop collecting fitness data from sensors 26 of the activity monitoring devices 20 and, optionally, transmit a pause and/or end command to the electronic display device 30 using the transmitter/receiver 29. In response to receiving the pause and/or end command, the processor 37 of the electronic display device 30 stops collecting fitness data. In one embodiment, the user taps the button 23 to pause tracking and either taps the button 23 again to restart tracking or holds the button 23 for a predefined amount of time to end tracking.

Methods for Automatically Trimming and Reclassifying Workout Data

Methods for operating the fitness tracking system 10 are described below. In particular, methods of operating an electronic display device 30 and/or activity monitor devices 20 to automatically trim and reclassify workout data are provided. In the description of the methods, statements that a method is performing some task or function refers to a controller or general purpose processor executing programmed instructions stored in non-transitory computer readable storage media operatively connected to the controller or processor to manipulate data or to operate one or more components in the fitness tracking system 10 to perform the task or function. Particularly, the processor 37 of the display device 30 and/or the processor 27 of the activity monitoring device 20 above may be such a controller or processor. Alternatively, the controller or processor may be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 5:
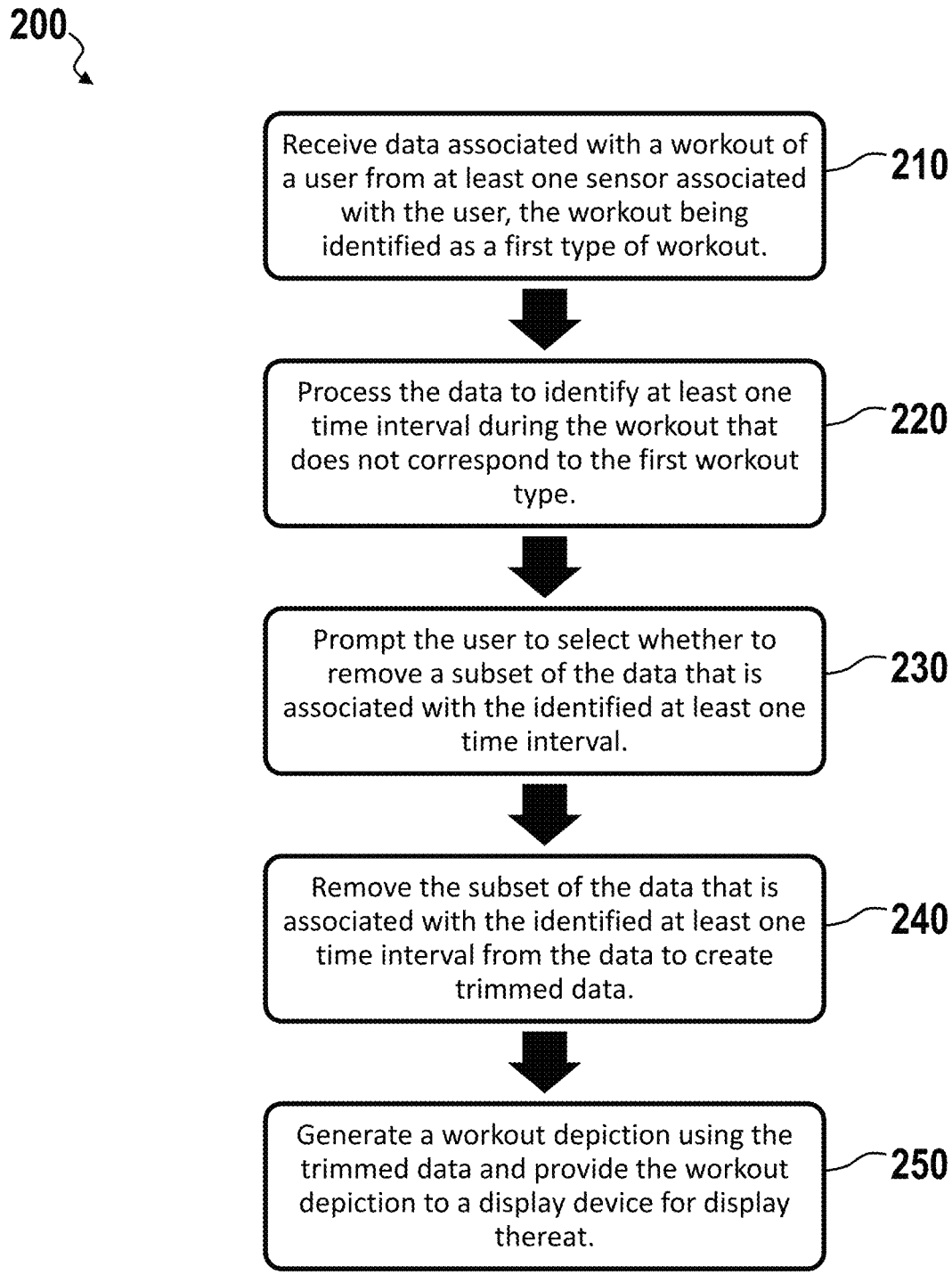
FIG. 5 is a logical flow diagram of a method of automatically trimming workout data.

FIG. 5 shows a logical flow diagram for a method 200 of automatically trimming workout data. The method 200 begins with a step of receiving data associated with a workout of a user from at least one sensor associated with the user, the workout being identified as a first type of workout (block 210). Particularly, with respect to the embodiments described in detail herein, the processor 37 is configured to receive workout data comprising a plurality of fitness data that are associated with a workout. In at least one embodiment, in response to an input from a user, the processor 37 is configured to initiate collection of the fitness data by any sensors of the electronic display device 30, including the GPS receiver 31, and initiate reception of fitness data from the activity monitoring devices 20. In at least one embodiment, the fitness data comprises data of a plurality of values for sensor data and/or various performance metrics as a function of time for the duration of the workout. In some embodiments, the fitness data of the workout is labeled, tagged, or otherwise identified as corresponding to a particular workout type (e.g., walk, run, road cycling, mountain biking, etc.), but may also correspond to an unidentified workout type. In at least one embodiment, the workout type is selected by the user prior to tracking the workout, such as by selecting the workout settings option 104 of FIG. 3 discussed above. Particularly, in response to a user selection, the processor 37 is configured to label, tag, or otherwise identify all of the fitness data of the workout as corresponding to the selected workout type. As will be discussed in further detail elsewhere herein, in another embodiment, a workout type may be automatically applied based on the collected data.

Figure 6:
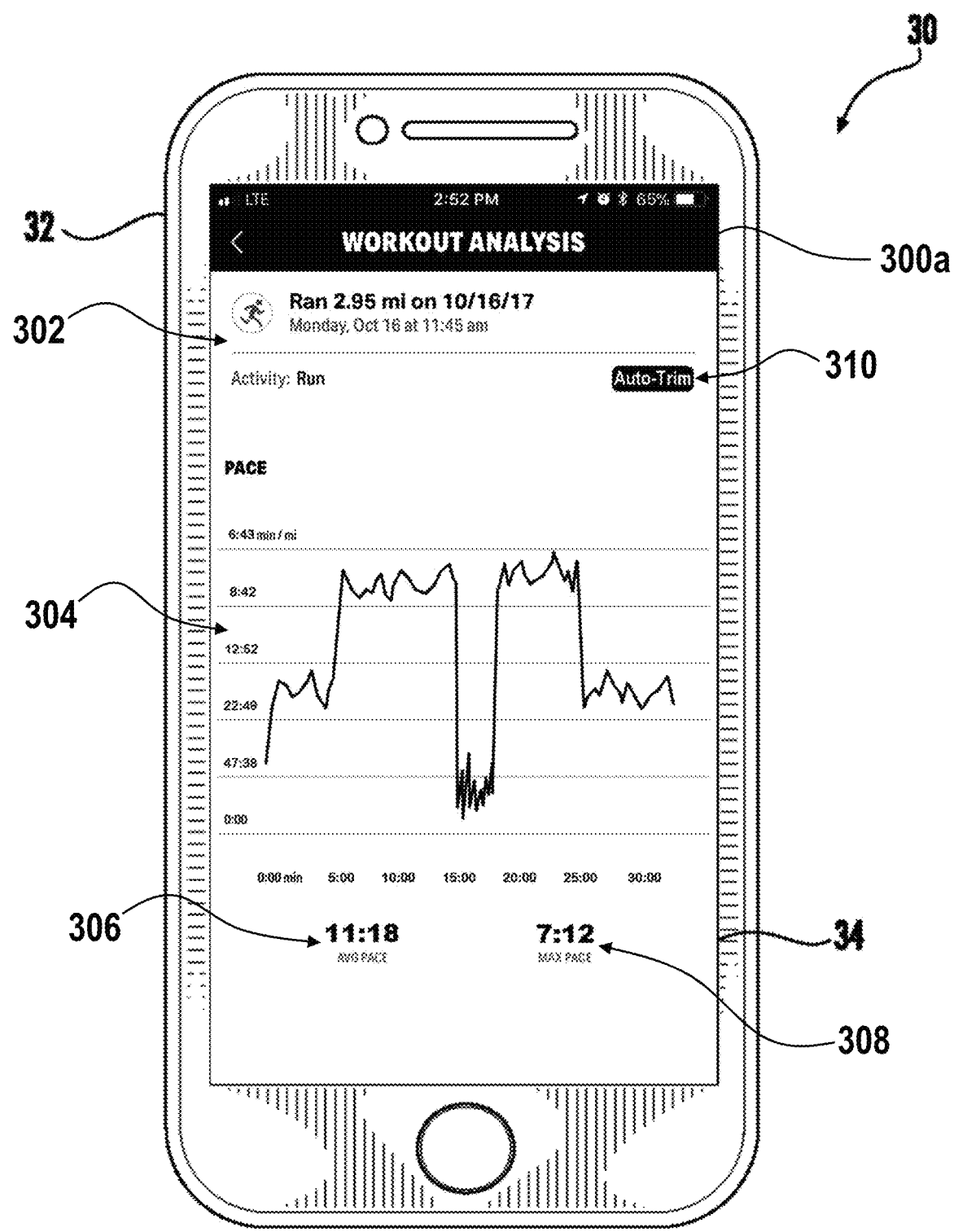
FIG. 6 is a plan view showing the electronic display device of the fitness tracking system of FIG. 1 displaying a post-workout screen that enables viewing of certain graphical depictions of the fitness data.

FIG. 6 shows an exemplary embodiment of a post-workout screen 300a that is displayed on the display screen 34 of the electronic display device 30 to enable viewing of certain graphical depictions of the fitness data for a workout. Particularly, in at least one embodiment, after receiving the plurality of fitness data of a workout and/or concluding the tracking thereof, the processor 37 executes instructions of the activity tracking application to display the post-workout screen 300a on the display screen 34. The post-workout screen 300a includes one or more workout depictions which enable the user to review and analyze the fitness data to better understand his or her performance during the workout. As used herein, the term "workout depiction" (which may also be referred to as "graphical depiction of a workout" or a "graphical depiction of fitness data") includes any chart, graph, plot, table, map, or text that summarizes, or otherwise conveys, any performance metric or other aspect of the fitness data. Some exemplary workout depictions include: one or more performance metrics plotted as a function of time during the workout (e.g. a plot showing pace as a function of time during the workout), a map showing a route traveling during the workout, and/or text including a value and label for a particular performance metric (e.g. a "12" value for a "Number of Reps" performance metric or a "6:52" value for the "Max Pace" performance metric).

As shown, the post-workout screen 300a includes a summary section 302 that provides high level summary information regarding the workout, such as the time, date, and/or place of the workout (e.g., "Monday, October 16 at 11:45 am"), the type of the workout (e.g., "Activity: Run"), and a representative performance metric (e.g., "Ran 2.95 mi on 10/16/2017"). The post-workout screen 300a further includes workout depictions 304, 306, and 308 which summarize the user's performance during the workout. Particularly, the post-workout screen 300a includes a plot 304 which shows the "PACE" performance metric plotted as a function of time during the workout. Additionally, the post-workout screen 300a includes performance metric summaries 306 and 308, which show an "AVG PACE" performance metric (e.g., having the value "11:18") and a "MAX PACE" performance metric (e.g., having the value "7:12"), respectively. It is noted that the particular workout depictions displayed on the post-workout screen 300a may vary. In some embodiments, the particular workout depictions displayed are customizable by the user. In some embodiments, the particular workout depictions displayed depends on the type of workout (e.g. displaying a number of steps for a walk, displaying pace for a run, displaying elevation for a hike, displaying heart rate, and/or displaying a number of reps/sets for strength training exercises).

Finally, in at least one embodiment, the post-workout screen 300a includes an automatic trim option 310 or an automatic reclassification option (not shown) that, when pressed by the user, causes the processor 37 to initiate an automatic trimming and/or automatic reclassification process which suggests possible edits to the fitness data, each of these features will be discussed in greater detail below.

The method 200 continues with a step of processing the data to identify at least one time interval during the workout that does not correspond to the first workout type (block 220). Particularly, the processor 37 is configured to execute instructions of the activity tracking application to process particular parameters of the fitness data to detect what activities or exercises are being performed by the user during different time intervals in order to identify any time intervals during which the user was not performing the type of workout which the workout is labeled, tagged, or otherwise identified as. For example, if the fitness data is labeled as corresponding to a run, the processor 37 is configured to process the fitness data to identify any time intervals during which the user was not running (e.g. time intervals corresponding to a warm up, a cool down, a rest or break, or another activity type such as push-ups, pull-ups, sit-ups, etc. performed before, during or after the run). In one embodiment, the processor 37 is configured to process the fitness data to specifically detect any warm-up or cool-down periods. As used herein, a "warm-up" is an interval of time at the beginning of a workout during which the user performed a different activity than an identified workout of interest or performed the workout of interest with a lesser intensity. Similarly, as used herein, a "cool-down" is an interval of time at the end of a workout during which the user performed a different activity than the identified workout of interest or performed the workout of interest with a lesser intensity. A "break" or "rest" includes intervals of time during a workout during which the user performed a different activity other than the identified workout of interest or performed the workout of interest with lesser intensity. Additional activities including e.g., other exercise or workout types (such as weight lifting, lunges, push-ups, sit-ups, etc.) may be identified before, during, or after a first activity in a manner similar to that described herein for warm-up, cool-down, and break identification.

In one embodiment, the processor 37 is configured to perform this processing of the fitness data in response to an input, such as the user pressing automatic trim option 310 or an automatic reclassification option (not shown) of the post-workout screen 300a. In other embodiments, the processor 37 is configured to perform this processing of the fitness data automatically after receiving the plurality of fitness data of the workout and/or after concluding the tracking thereof.

In some embodiments, the processor 37 is configured to employ a rules-based processing of particular parameters of the fitness data in order to detect what activities or exercises are being performed by the user during different time intervals. Particularly, in one embodiment, the processor 37 is configured to process acceleration data of the fitness data, such as from an accelerometer of the activity monitoring device 20, to detect a known signature associated with a human stride (e.g. taking steps). The known signature may comprise a periodic or semi-periodic acceleration pulse within a predefined range of frequencies corresponding to steps taken by the user (i.e. a series of acceleration pulses at somewhat regular intervals with a frequency that could reasonably correspond to a human stride rate). In the case of a wrist-worn accelerometer, the known signature may further comprise periodic accelerations corresponding to a swinging arm, generally having a cadence that correlates with the aforementioned periodic acceleration pulse corresponding to each step. Similarly, heart rate or other physiological parameters may be used.

In some embodiments, if the known signature for a human stride (or other parameter) is detected, the processor 37 is further configured to further process the fitness data in order to distinguish between the different varieties of activities or exercise involving that parameter; e.g. for a human stride, the activities may include walking, running, hiking, and climbing stairs. For example, in one embodiment, the processor 37 is configured to process positional data of the fitness data, such as from the GPS receiver 31, to determine a pace of the user during different time intervals of the workout. If the pace exceeds a predetermined threshold (e.g. 5 mph) for a particular interval of time, the processor 37 is configured to determine that that user was running during that interval of time. Similarly, if the pace is below a predetermined threshold (e.g. 5 mph) for a particular interval of time, the processor 37 is configured to determine that that user was walking or hiking during that interval of time. If the pace falls below a further predetermined threshold (e.g. 0.1 mph) and the known signature for a human stride is not detected, the processor 37 is configured to determine that the user has stopped or is taking a break. In some embodiments, the processor 37 is further configured to process elevation data of the fitness data to determine whether the user may have been hiking or climbing stairs. If processing of the elevation data reveals many inconsistent elevation changes during an interval of time, the processor 37 is configured to determine that the user was hiking during that interval of time. Similarly, if processing of the elevation data reveals periodic and alternating elevation changes during an interval of time, the processor 37 is configured to determine that the user was climbing up and down stairs during that interval of time.

In some embodiments, the processor 37 is configured to apply similar signature and/or threshold based techniques for detecting other types of activities or exercises. In some embodiments, multiple data types may be evaluated together to determine whether a match is made to any number of activities. In one embodiment, the processor 37 is configured to process acceleration data and positional data of the fitness data to determine whether the user is riding a bike. For example, if the pace of user exceeds a predetermined threshold (e.g. 5 mph), but the known signature for a human stride is not detected during an interval of time, the processor 37 is configured to determine that the user was riding a bike during that period of time. In some embodiments, the processor 37 is further configured to process the acceleration data of the fitness data to determine whether the user may have been mountain biking. If the processing reveals an erratic acceleration signature during an interval of time, the processor 37 is configured to determine that the user was mountain biking during the interval of time. Similarly, if the processing reveals a smooth acceleration signature during an interval of time, the processor 37 is configured to determine that the user was road biking during the interval of time. In some embodiments, the processor 37 is configured to use acceleration data signatures (in combination with other data such as heart rate, speed, position, elevation, etc.) to detect more complex motions, such as various strength training exercises. In one embodiment, the processor 37 is configured to detect and count repetitions for certain exercises. In one embodiment, the processor 37 is configured to process the fitness data to detect a known signature for a transition from one exercise to another, such as transitioning from walking to running, from running to walking, from walking to push-ups, from push-ups to lunges, etc.

In some embodiments, the processor 37 is configured to take into account what type of workout the user initially identified the workout as or what type of workout the user was instructed to perform. For example, if the user identified that he or she was going to run, the processor 37 may be configured to perform processing to detect time intervals during which the user may have walked instead of ran or stopped to rest, but not perform any processing to detect other unrelated exercises such as sit-ups or push-ups. Similarly, if the user was instructed to perform pre-defined intervals of walking and running, the processor 37 may be configured to detect the expected transitions from running to walking or from walking to running at the expected points in time. Alternatively, if the user selects or was instructed to perform a mixed workout, the specific instructions provided may be used to identify various activities performed at the expected points in time.

In some embodiments, rather than rigid rules-based processing, the processor 37 is configured to utilize a machine learning model to process parameters of the fitness data in order to detect what activities or exercises are being performed by the user during different time intervals. As used herein, the term "machine learning model" refers to a system or set of program instructions configured to implement an algorithm or mathematical model that predicts and provides a desired output based on a given input. A machine learning model is not explicitly programmed or designed to follow particular rules in order to provide the desired output for a given input. Instead, the machine learning model is provided with a corpus of training data from which identifies or "learns" patterns and statistical relationships or structures in the data, which are generalized to make predictions with respect to new data inputs. In one embodiment, the processor 37 is configured to apply a machine learning model, which has been trained using training fitness data from a plurality of users, to predict what activities or exercises the user was performing during different intervals of time during the workout.

Once the fitness data of the workout has been processed to identify what activities or exercises the user was performing during different intervals of time during the workout, the processor 37 is configured to compare the detected types of workouts with the type of workout that the workout was originally labeled, tagged, or otherwise identified as in order to determine whether any intervals of time should be removed, omitted, or hidden as a being unrelated to tracked workout.

The method 200 continues with a step of prompting the user to select whether to remove a subset of the data that is associated with the identified at least one time interval (block 230). Particularly, the processor 37 is configured to execute instructions of the activity tracking application to generate a visual or audible prompt to the user, via which the user can provide a responsive input, regarding whether data associated with a particular identified interval of time during the workout should be removed, omitted, or hidden.

Figure 7:
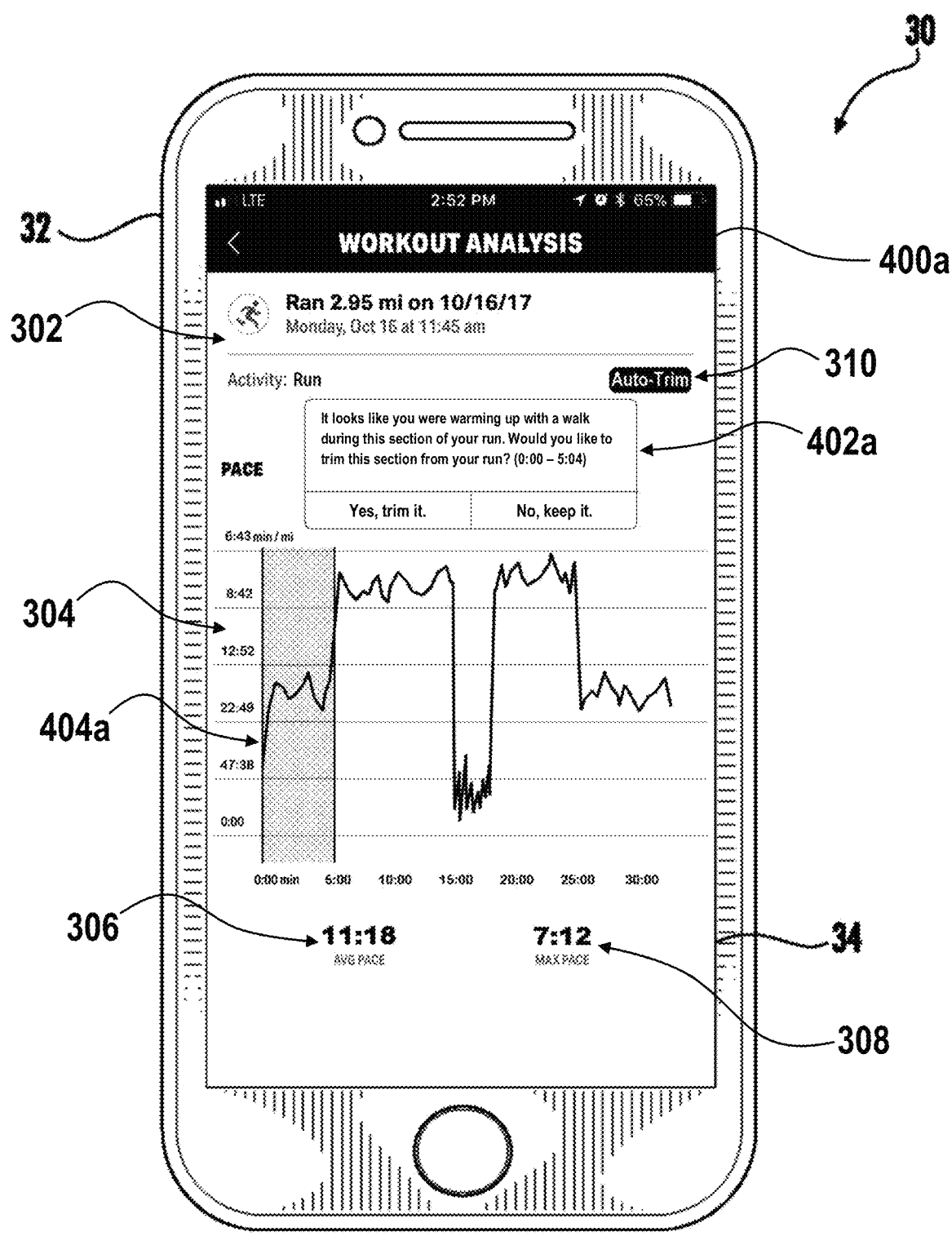
FIG. 7 is a plan view showing the electronic display device of the fitness tracking system of FIG. 1 displaying a trim suggestion screen that enables the user to select whether data associated with a particular time interval should be removed.

FIG. 7 shows an exemplary embodiment of a trim suggestion screen 400a that is displayed on the display screen 34 of the electronic display device 30 to enable the user to select whether data associated with an identified time interval should be removed or hidden from the fitness data and graphical depictions thereof. Particularly, in at least one embodiment, after identifying at least one interval of time during which the user was not performing the initially identified the type of workout, the processor 37 executes instructions of the activity tracking application to display the trim suggestion screen 400a on the display screen 34. The trim suggestion screen 400a is similar to the post-workout screen 300a, except that it further includes a prompt 402a and highlighting 404a. In the example, the processor 37 has identified that the user was walking, rather than running, during an interval of time extending from 0:00 to 5:04. The prompt 402a includes a message indicating a suggestion to remove portion of the fitness data from the workout (e.g. "It looks like you were warming up with a walk during this section of your run. Would you like to trim this section from your run? (0:00-5:04)"). Additionally, the prompt 402a includes options (e.g. "Yes, trim it." and "No, keep it.") which the user can press or otherwise select to indicate his or her response to the prompt 402a. In the embodiment shown, the trim suggestion screen 400a further includes the highlighting 404a, which overlays the plot 304 and identifies the time interval which is suggested for removal from the workout (e.g. the time interval extending from 0:00 to 5:04, during which the processor 37 identified that the user was walking rather than running). In one embodiment, the user may touch or otherwise control the highlighting 404a in order to manually adjust the time interval to be different than the automatically detected time interval.

Figure 8:
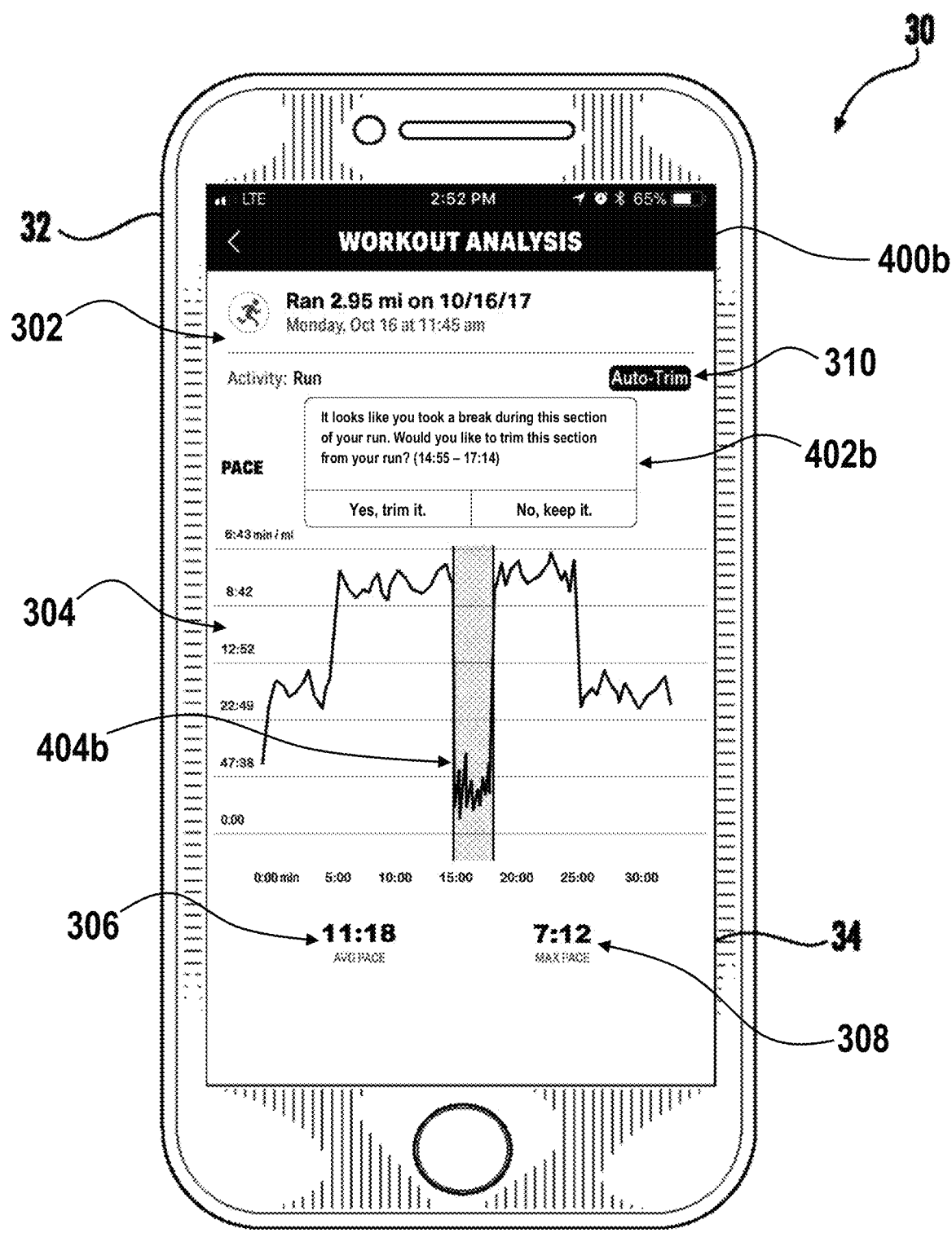
FIG. 8 is a plan view showing the electronic display device of the fitness tracking system of FIG. 1 displaying a further trim suggestion screen similar to that of FIG. 7.
Figure 9:
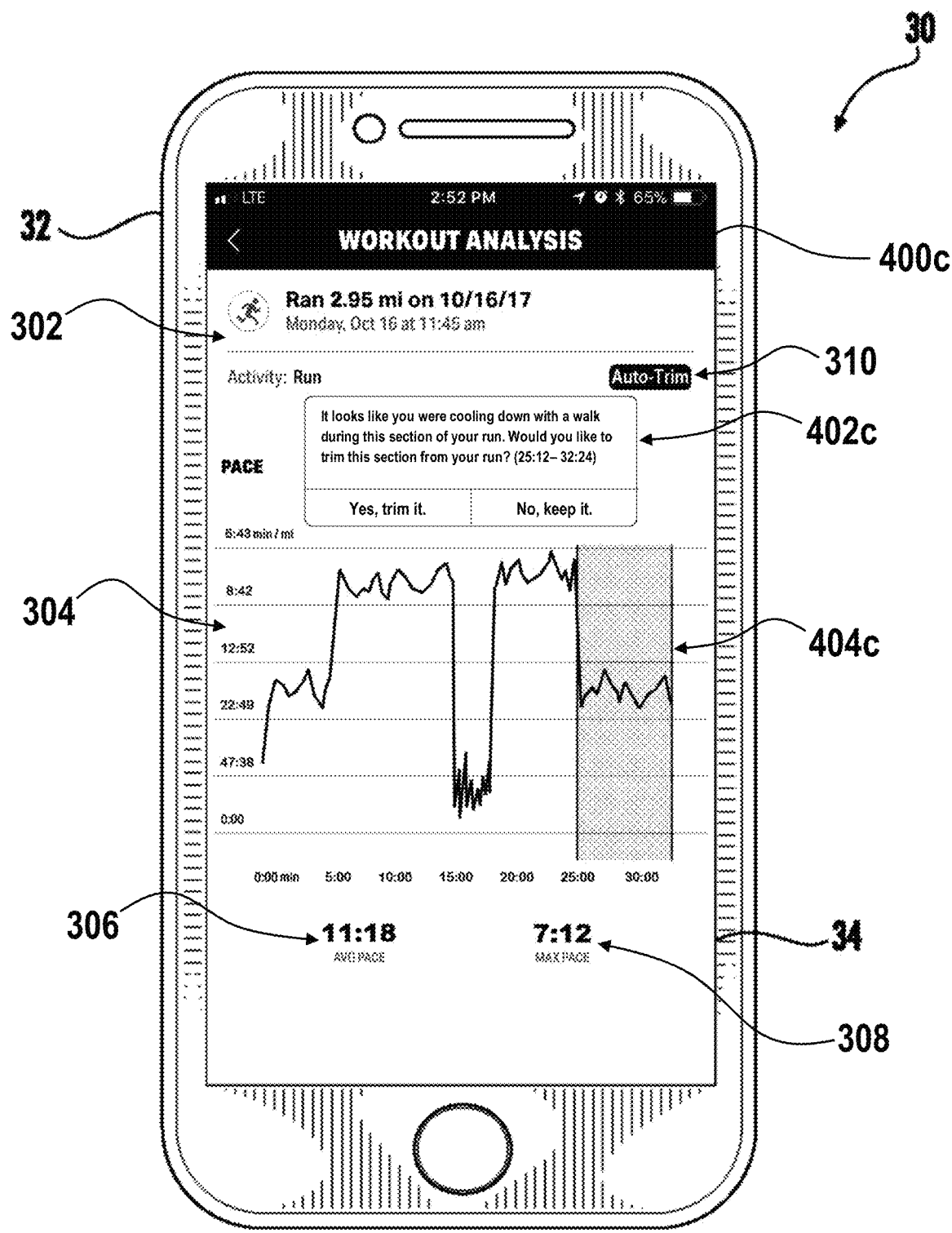
FIG. 9 is a plan view showing the electronic display device of the fitness tracking system of FIG. 1 displaying yet another trim suggestion screen similar to that of FIG. 7.

After the user makes a selection via the prompt 402a, the processor 37 is configured to display similar prompts for each additional identified time interval which the user was not running. FIG. 8 shows an exemplary embodiment of a trim suggestion screen 400b. In this example, the processor 37 has identified that the user stopped to take a break during an interval of time extending from 14:55 to 17:14. The trim suggestion screen 400b includes a prompt 402b having a message (e.g. "It looks like you took a break during this section of your run. Would you like to trim this section from your run? (14:55-17:14)") and options (e.g. "Yes, trim it." and "No, keep it.") via which the user can respond. Highlighting 404b overlays the plot 304 and identifies the time interval which is suggested for removal (e.g. the time interval extending from 14:55 to 17:14). Finally, FIG. 9 shows an exemplary embodiment of a trim suggestion screen 400c. In this example, the processor 37 has identified that the user was walking, rather than running, during an interval of time extending from 25:12 to 32:24. The trim suggestion screen 400c includes a prompt 402c having a message (e.g. "It looks like you were cooling down with a walk during this section of your run. Would you like to trim this section from your run? (25:12-32:24)") and options (e.g. "Yes, trim it." and "No, keep it.") via which the user can respond. Highlighting 404c overlays the plot 304 and identifies the time interval which is suggested for removal (e.g. the time interval extending from 25:12 to 32:24).

The method 200 continues with a step of removing the subset of the data that is associated with the identified at least one time interval from the data to create trimmed data (block 240). Particularly, the processor 37 is configured to execute instructions of the activity tracking application to create trimmed data by removing, omitting, deleting, hiding, or otherwise identifying as being unrelated to the tracked workout, a subset of the fitness data that is associated with the identified time intervals in response to receiving a user selection indicating that the user would like to trim the data from the workout. In one embodiment, the processor 37 is configured to delete the subset of the fitness data from a local storage device, such as the memory 38, and/or transmit a message or command to indicating that the data should be deleted to a remote server which stores the data. In other embodiments, the processor 37 is configured to reversibly label, tag, or otherwise mark the subset of the fitness data as being unrelated to the tracked workout, and/or transmit a message or command to the remote server indicating that the data should be labelled, tagged, or otherwise marked accordingly. In this way, the subset of the fitness data continues to be stored in association with the tracked workout and may be later recovered or used for other purposes.

Finally, the method 200 continues with a step of generating a workout depiction using the trimmed data and providing the workout depiction to a display device for display thereat (block 250). Particularly, the processor 37 is configured to execute instructions of the activity tracking application to generate at least one graphical depiction of the workout using the trimmed data which excludes the subset of the fitness data that is associated with the time intervals deemed unrelated to the tracked workout. The processor 37 is configured to provide the generated workout depiction(s) to the display 34 for display thereat.

Figure 10:
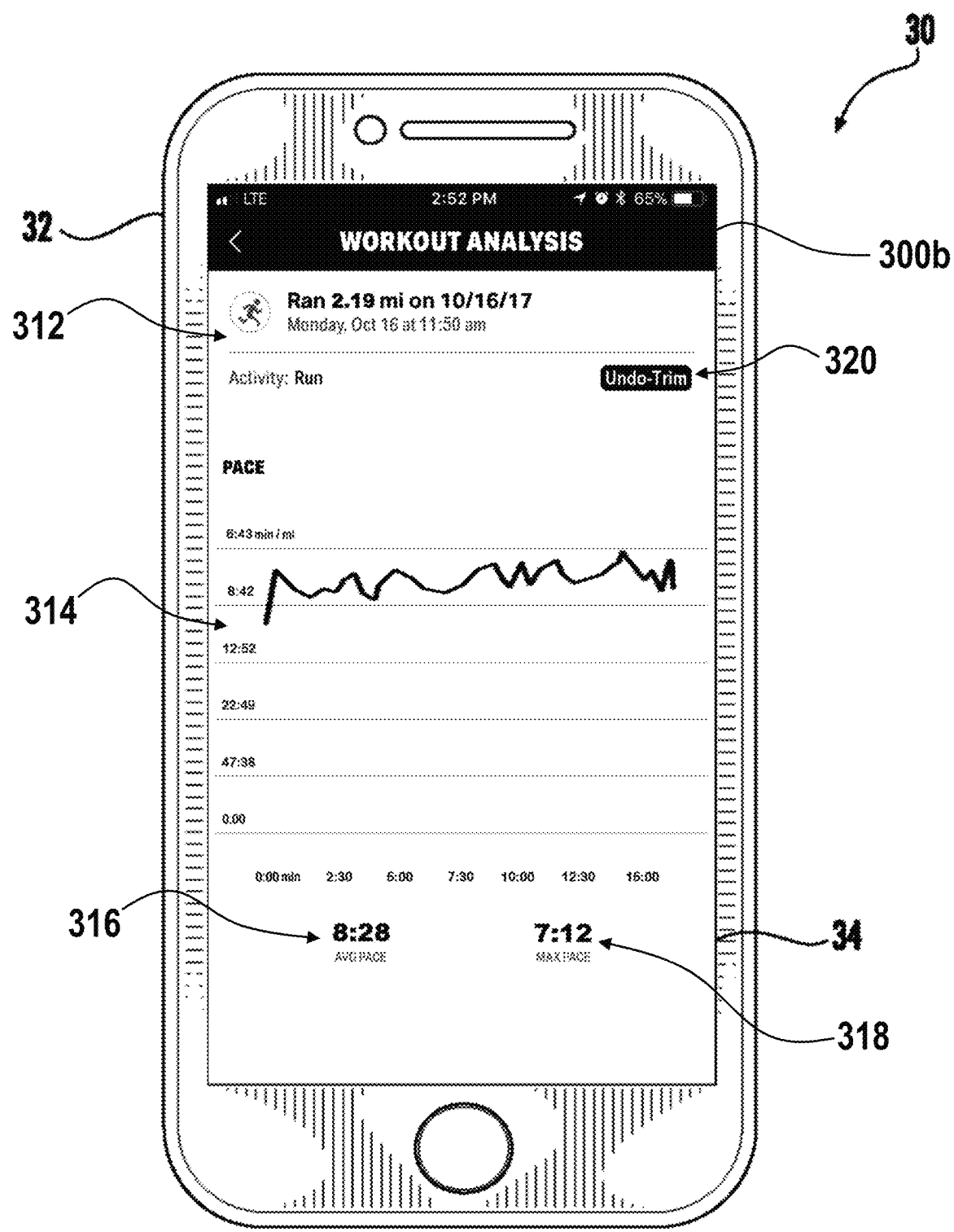
FIG. 10 is a plan view showing the electronic display device of the fitness tracking system of FIG. 1 displaying an updated post-workout screen that enables viewing of updated graphical depictions of the fitness data for the workout.

FIG. 10 shows an exemplary embodiment of an updated post-workout screen 300b that is displayed on the display screen 34 of the electronic display device 30 to enable viewing of updated graphical depictions of the fitness data for the workout. Particularly, in at least one embodiment, after creating the trimmed data which excludes the subset of the fitness data that is associated with the time intervals deemed unrelated to the tracked workout, the processor 37 executes instructions of the activity tracking application to display the updated post-workout screen 300b on the display screen 34. The updated post-workout screen 300b includes one or more updated workout depictions 314, 316, and 318 which enable the user to review and analyze the fitness data to better understand his or her performance during the workout. In at least one embodiment, the updated workout depictions 314, 316, and 318 correspond with the workout depictions 304, 306, and 318. Particularly, as shown, the updated post-workout screen 300b includes a plot 314 which shows the "PACE" performance metric plotted as a function of time during the workout, but excluding the time intervals which were deemed unrelated to the workout and which were selected for removal by the user. Additionally, the updated post-workout screen 300b includes exemplary performance metric summaries 316 and 318, which show an "AVG PACE" (e.g., having the value "8:28") and a "MAX PACE" (e.g., having the value "7:12"), respectively. As can be seen, the updated workout depictions 314, 316, and 318 provide a more useful and more accurate summary of the user's performance during the workout by excluding the time intervals which were deemed unrelated to the workout. As an example, the "AVG PACE" of "8:28" more accurately reflects the average pace of the user during his or her run because it excludes the time intervals during which the user was walking or taking a break. Finally, as shown, the updated post-workout screen 300b includes an updated summary section 312 which has been updated with respect to the summary 302. In particular, the time of the run is updated from "11:45 am" to "11:50 am," due to the five minute warm-up walk being excluded, and the distance is updated from "2.95 mi" to "2.19 mi," due to the distance accrued while walking being excluded. Additional or alternative workout performance metrics may be provided with equal success.

Finally, in one embodiment, the updated post-workout screen 300b includes an undo trim option 320 that, when pressed by the user, causes the processor 37 to reverse automatic trimming process and restore the original fitness data. Particularly, the processor 37 is configured to reverse the previous labelling, tagging, or marking of the subset of the fitness data that were deemed unrelated to the workout and return to the post-workout screen 300a having the original workout depictions 304, 306, and 308.

The process described above for prompting the user regarding a proposed trimming of the fitness data can be simplified or even eliminated entirely. Particularly, in some embodiments, the processor 37 is configured to remove the subset of the fitness data that is associated with the identified time intervals from the data to create the trimmed data (block 240) without first prompting the user to select whether to remove the subset of the fitness data (block 230). In one embodiment, the processor 37 is configured to determine a confidence score regarding whether data associated with a particular time interval should be removed or hidden from the fitness data and skip the step of prompting the user (block 230) in response to the confidence score exceeding a predetermined threshold.

Figure 11:
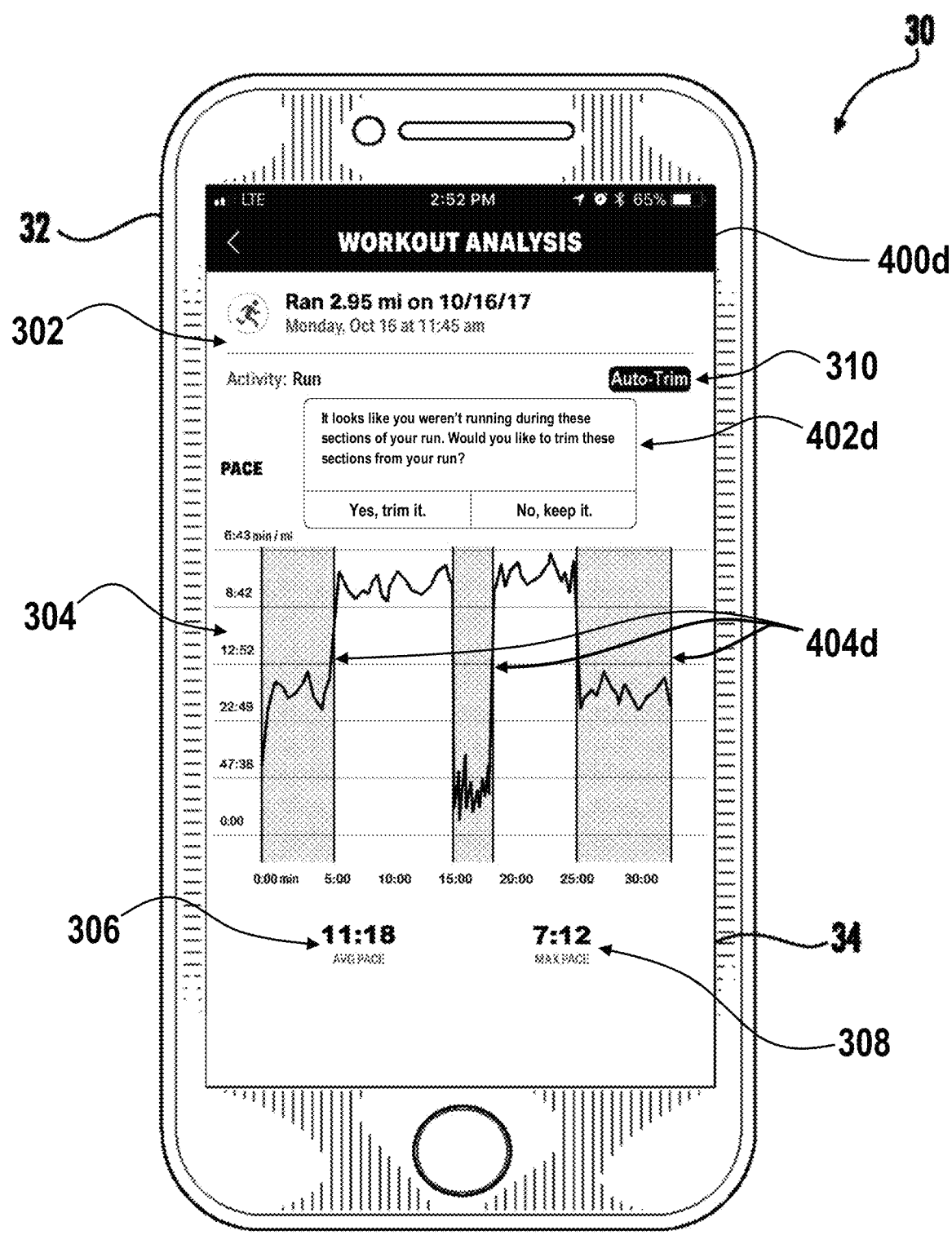
FIG. 11 is a plan view showing the electronic display device of the fitness tracking system of FIG. 1 displaying an alternative trim suggestion screen.

FIG. 11 shows an exemplary embodiment of an alternative trim suggestion screen 400d that is displayed on the display screen 34 of the electronic display device 30 to enable the user to select whether data associated with time intervals should be removed or hidden from the fitness data and graphical depictions thereof. Particularly, in one embodiment, a single prompt and/or screen is used for all of the identified time intervals during the workout that do not correspond to the particular workout type. After identifying the at least one interval of time during which the user was not performing the initially identified the type of workout, the processor 37 executes instructions of the activity tracking application to display the alternative trim suggestion screen 400d on the display screen 34. The alternative trim suggestion screen 400d is similar to the trim suggestion screens 400*a-c*, except that it includes highlighting 404*d* which overlays the plot 304 and identifies all of the identified time intervals which are suggested for removal from the workout (e.g. the time interval extending from 0:00 to 5:04, the time interval extending from 14:55 to 17:14, and the time interval extending from 25:12 to 32:24). The alternative trim suggestion screen 400*d* similarly includes a prompt 402*d* having a message indicating a suggestion to remove portions of the fitness data from the workout (e.g. "It looks like you weren't running during these sections of your run. Would you like to trim these sections from your run?"), and having options (e.g. "Yes, trim it." and "No, keep it.") which the user can press or otherwise select to indicate his or her response to the prompt 402*d*.

Figure 12:
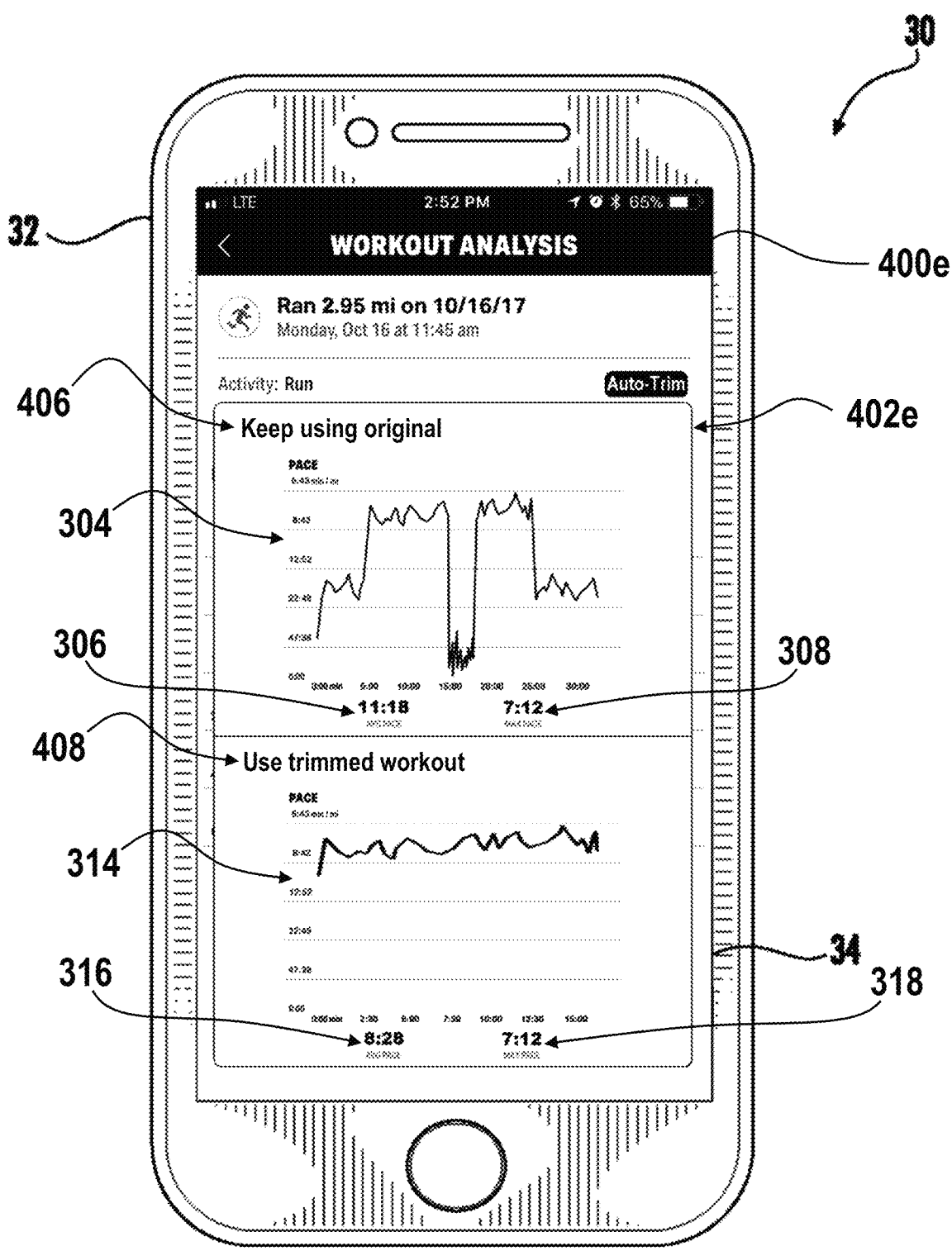
FIG. 12 is a plan view showing the electronic display device of the fitness tracking system of FIG. 1 displaying another alternative trim suggestion screen.

FIG. 12 shows an exemplary embodiment of a further alternative trim suggestion screen 400*e* that is displayed on the display screen 34 of the electronic display device 30 to enable the user to select whether data associated with time intervals should be removed or hidden from the fitness data and graphical depictions thereof. The alternative trim suggestion screen 400*e* is similar to the trim suggestion screens 400*a-d*, except that, instead of highlighting the intervals of time that are suggested for removal, the alternative trim suggestion screen 400*e* shows a preview of updated/trimmed workout depictions. Particularly, the alternative trim suggestion screen 400*e* similarly includes a prompt 402*e* having options 406 and 408 (e.g. "Keep using original and "Use trimmed workout") which the user can press or otherwise select to indicate his or her response to the prompt 402*e*. The option 406 is accompanied by the original workout depictions 304, 306, 308, which are described in greater detail above with respect to FIG. 6. Similarly, the option 408 is accompanied by the updated workout depictions 314, 316, 318, which are described in greater detail above with respect to FIG. 10. In this way, the alternative trim suggestion screen 400*e* enables the user to see a preview of what the workout depictions would look like if he or she chooses to trim the fitness data as suggested.

Figure 13:
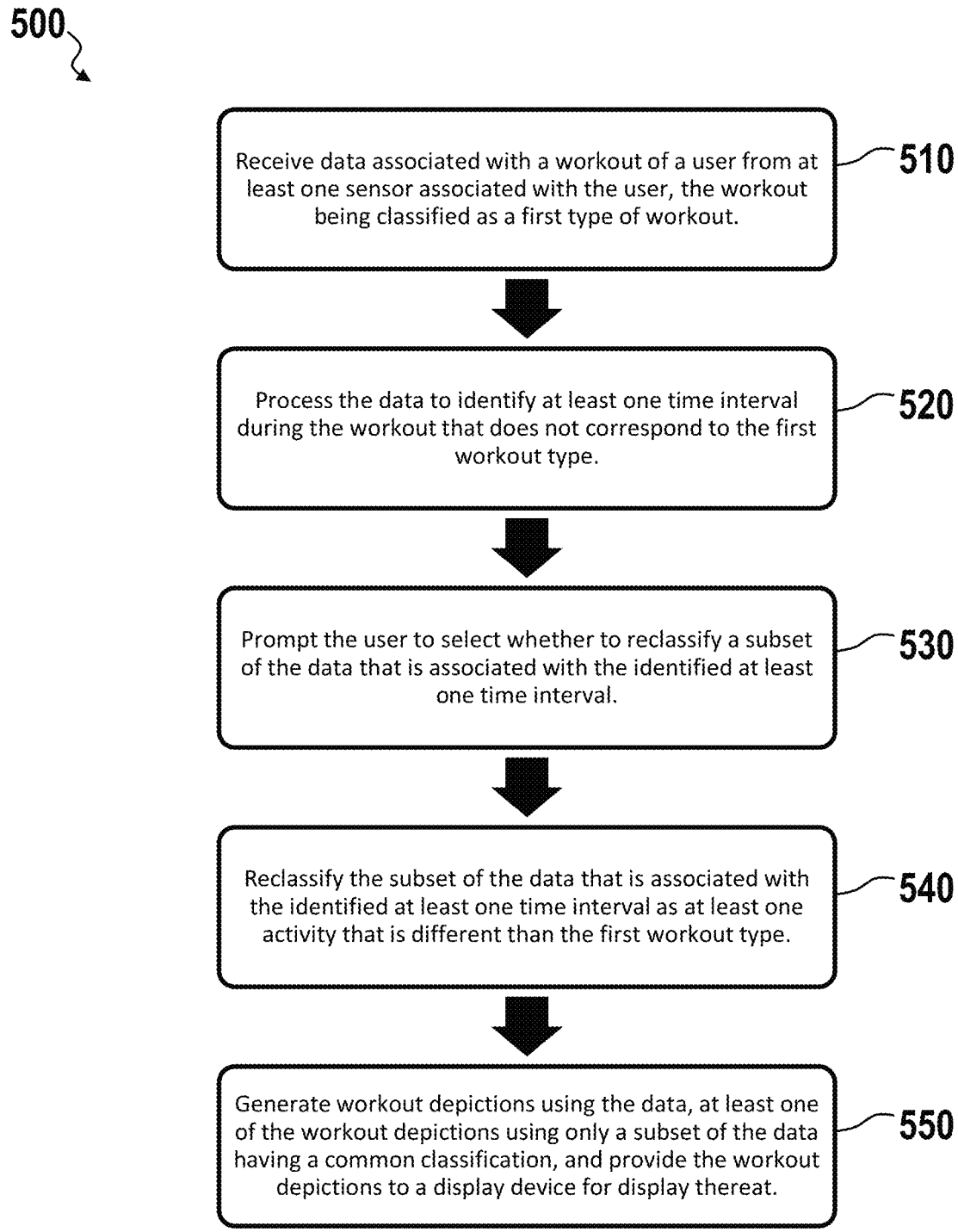
FIG. 13 is a logical flow diagram of a method of automatically reclassifying workout data.

FIG. 13 shows a logical flow diagram for a method 500 of automatically reclassifying workout data. The method 500 begins with a step of receiving data associated with a workout of a user from at least one sensor associated with the user, the workout being classified as a first type of workout (block 510). Particularly, with respect to the embodiments described in detail herein, the processor 37 is configured to receive workout data comprising a plurality of fitness data that are associated with a workout. The fitness data of the workout may be labeled, tagged, or otherwise identified as corresponding to a particular workout type (e.g., walk, run, road cycling, mountain biking, weight lifting, etc.), but may also correspond to an unidentified workout type. The method 500 continues with a step of processing the data to identify at least one time interval during the workout that does not correspond to the first workout type (block 520). Particularly, the processor 37 is configured to execute instructions of the activity tracking application to process particular parameters of the fitness data to detect what activities or exercises are being performed by the user during different time intervals in order to identify any time intervals during which the user was not performing the type of workout which the workout is labeled, tagged, or otherwise identified as. The steps 510 and 520 of the method 500 are essentially similar to the steps 210 and 220 of the method 200 and are not described again in complete detail.

The method 500 continues with a step of prompting the user to select whether to reclassify a subset of the data that is associated with the identified at least one time interval (block 530). Particularly, the processor 37 is configured to execute instructions of the activity tracking application to generate a visual or audible prompt to the user, via which the user can provide a responsive input, regarding whether data associated with a particular identified interval of time during the workout should be reclassified as one or more other types of workouts and/or non-workout activities (e.g., a break or rest). In some embodiments, the processor 37 executes instructions of the activity tracking application to display the one or more reclassification suggestion screens (not shown) on the display screen 34. The reclassification suggestion screens are essentially similar to the trim suggestion screens 400*a-e* and not described again in complete detail here, except that the prompts of the reclassification suggestion screens include appropriately modified messages (e.g. "It looks like you were warming up with a walk during this section of your run. Would you like to reclassify this section as a warm-up walk? (0:00-5:04)," "It looks like you took a break during this section of your run. Would you like to reclassify this section as a break? (14:55-17:14)," and "It looks like you were cooling down with a walk during this section of your run. Would you like to reclassify this section as a cool-down walk? (25:12-32:24)") and appropriately modified options (e.g., "Yes, reclassify it." and "No, don't reclassify it.").

The method 500 continues with a step of reclassifying the subset of the data that is associated with the identified at least one time interval as at least one activity that is different than the first workout type (block 540). Particularly, the processor 37 is configured to execute instructions of the activity tracking application to create reclassify a subset of the fitness data associated with an identified interval of time by labelling, flagging, tagging, or otherwise marking the subset of the fitness data as corresponding to another type of workout and/or non-workout activity (e.g., a break or rest), in response to receiving a user selection indicating that the user would like to reclassify the respective subset of the fitness data. In some embodiments, the processor 37 is configured to transmit a message or command to a remote server indicating that the respective subset of the fitness data should be labelled, tagged, or otherwise marked as the other type of workout and/or a non-workout activity.

Finally, the method 500 continues with a step of generating workout depictions using the data, at least one of the workout depictions using only a subset of the data having a common classification, and providing the workout depictions to a display device for display thereat (block 550). Particularly, the processor 37 is configured to execute instructions of the activity tracking application to generated one or more workout depictions using the fitness data which illustrate, identify, or other otherwise convey that some portions of the fitness data are classified differently than other portions of the fitness data. Particularly, in at least one embodiment, the processor 37 is configured to generate one or more workout depictions using only fitness data classified as a same workout type (e.g., a plot using only data associated with time intervals classified as a run, as similarly shown in FIG. 10, or a steps performance metric using only data associated with time intervals classified as a walk). In some embodiments, the processor 37 is configured to generate at least one workout depiction using fitness data classified as a multiple workout types in such a way that illustrates, indicates, or otherwise conveys which portions of the fitness data are classified as each workout type (e.g., a plot of a performance metric as a function of time, with different intervals of time labeled according to the type of workout being performed). The processor 37 is configured to provide the generated workout depiction(s) to the display 34 for display thereat.

Figure 14:
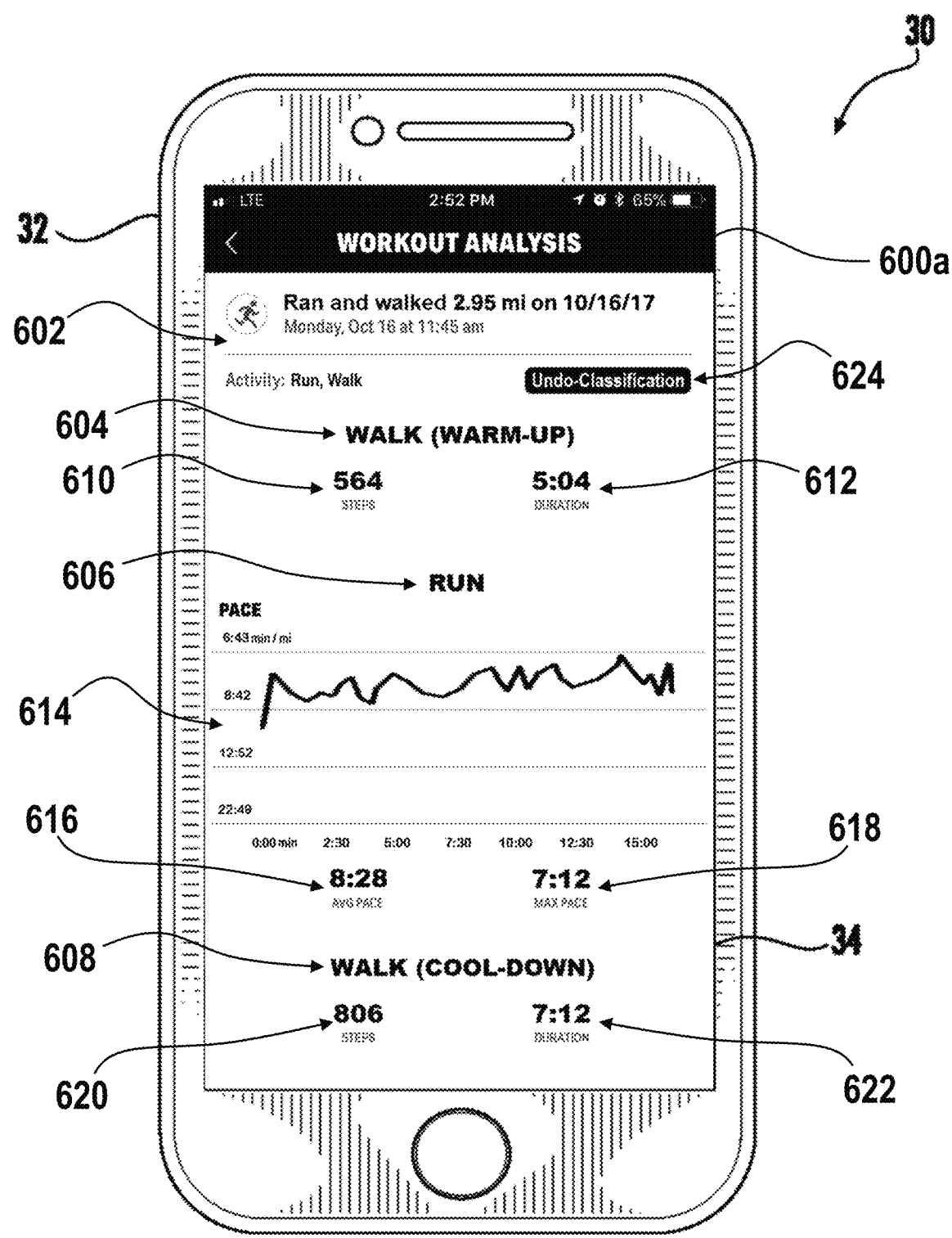
FIG. 14 is a plan view showing the electronic display device of the fitness tracking system of FIG. 1 displaying an updated post-workout screen that enables viewing of certain graphical depictions of reclassified fitness data.

FIG. 14 shows an exemplary embodiment of an updated post-workout screen 600*a* that is displayed on the display screen 34 of the electronic display device 30 to enable viewing of certain graphical depictions of reclassified fitness data for a workout. Particularly, in at least one embodiment, after reclassifying fitness data associated with particular intervals of time as one or more other types of workouts and/or non-workout activities, the processor 37 executes instructions of the activity tracking application to display the updated post-workout screen 600*a* on the display screen 34. The updated post-workout screen 600*a* includes a plurality of updated workout depictions which enable the user to review and analyze the fitness data to better understand his or her performance during the workout. Although the examples provided herein illustrates a user who is running or walking, it is appreciated that any number of other physical activities may be identified and displayed as discussed herein.

As shown, the updated post-workout screen 600*a* includes a summary section 602 that provides high level summary information regarding the workouts performed, such as the time, date, and/or place of the workout (e.g., "Monday, October 16 at 11:45 am"), the types of workouts performed (e.g., "Activity: Run, Walk"), and a representative performance metric (e.g., "Ran and walked 2.95 mi on 10/16/2017"). The updated post-workout screen 600*a* further includes activity sections 604, 606, and 608 having workout depictions 610, 612, 614, 616, 618, 620, and 622 which summarize the user's performance during the respective workout types and/or activities of the workout.

Particularly, in the example, the updated post-workout screen 600*a* includes a warm-up walk section 604 having an appropriate label (e.g., "WALK (WARM-UP)"), which corresponds to the walk during the interval of time from 0:00 to 5:04. The warm-up walk section 604 includes performance metric summaries 610 and 612, which show a "STEPS" performance metric (e.g., having the value "564") and a "DURATION" performance metric (e.g., having the value "5:04"), respectively. Additionally, the updated post-workout screen 600*a* further includes a run section 606 having an appropriate label (e.g., "RUN"), which corresponds to the runs during the intervals of time from 5:04 to 14:55 and from 17:14 to 25:12. The run section 606 includes a plot 614 which shows the "PACE" performance metric plotted as a function of time during the workout, but excluding the time intervals which were deemed to correspond to activities other than running. The run section 606 includes performance metric summaries 616 and 618, which show an "AVG PACE" performance metric (e.g., having the value "8:28") and a "MAX PACE" performance metric (e.g., having the value "7:12"), respectively. Furthermore, the updated post-workout screen 600*a* further includes a cool-down walk section 608 having an appropriate label (e.g., "WALK (COOL-DOWN)"), which corresponds to the walk during the interval of time from 25:12 to 32:24. The cool-down walk section 608 includes performance metric summaries 620 and 622, which show a "STEPS" performance metric (e.g., having the value "806") and a "DURATION" performance metric (e.g., having the value "7:12"), respectively. It is noted that the particular workout depictions displayed on the updated post-workout screen 600*a* may vary. In some embodiments, the particular workout depictions displayed are customizable by the user. In some embodiments, the particular workout depictions displayed in each section depend on the type of workout (e.g. displaying a number of steps for a walk, displaying pace for a run, displaying elevation for a hike, and displaying a number of reps/sets for strength training exercises). Additional metrics may be provided in combination or substitution with those provided herein such as e.g., heart rate, average heart rate, elevation change, average elevation, etc.

Finally, in one embodiment, the updated post-workout screen 600*a* includes an undo classification option 624 that, when pressed by the user, causes the processor 37 to reverse the automatic classification process and restore the original fitness data. Particularly, the processor 37 is configured to reverse the previous labelling, tagging, or marking of the subset of the fitness data that were deemed to correspond to another type of workout and/or non-workout activities and return to the post-workout screen 300*a* having the original workout depictions 304, 306, and 308.

Figure 15:
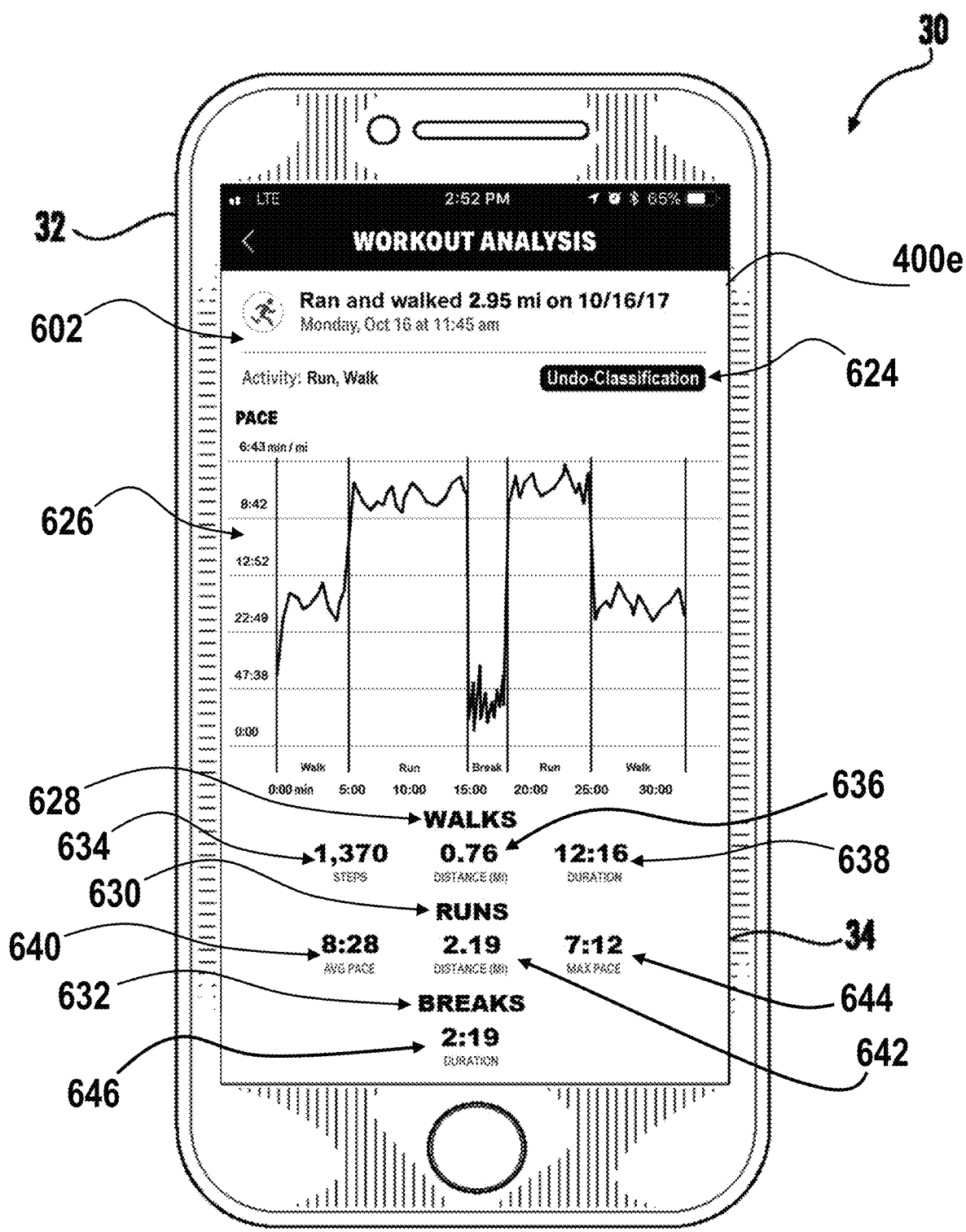
FIG. 15 is a plan view showing the electronic display device of the fitness tracking system of FIG. 1 displaying an alternative post-workout screen that enables viewing of different graphical depictions of reclassified fitness data.

FIG. 15 shows an exemplary alternative embodiment of an updated post-workout screen 600*b* that is displayed on the display screen 34 of the electronic display device 30 to enable viewing of certain graphical depictions of the fitness data for a workout. Particularly, in at least one embodiment, after reclassifying fitness data associated with particular intervals of time as one or more other types of workouts and/or non-workout activities, the processor 37 executes instructions of the activity tracking application to display the updated post-workout screen 600*b* on the display screen 34. The updated post-workout screen 600*b* is similar to the updated post-workout screen 600*a* and similarly includes the summary section 602 and the undo classification option 624, but includes a different arrangement of workout depictions.

Particularly, in the example, the updated post-workout screen 600*b* includes a plot 626 which shows the "PACE" performance metric plotted as a function of time during the entire workout. The plot 626 includes various time intervals which are indicated by vertical dividing lines and labeled with corresponding labels indicating what type of workout and/or activity was performed during the respective time interval (e.g., "Walk," "Run," and "Break"). In this way, the plot 626 illustrates fitness data having multiple different classifications, but illustrates which portions of the fitness data correspond to each classification. In some embodiments, the various time intervals may be indicated using other means, such as highlighting with particular colors corresponding to each workout type. In addition to the plot 626, the updated post-workout screen 600*b* further includes activity sections 628, 630, and 632 having additional workout depictions 634, 636, 638, 640, 642, 644, and 646 which summarize the user's performance during the respective workout types and/or activities of the workout.

Particularly, in the example, the updated post-workout screen 600*b* includes a walks section 628 having an appropriate label (e.g., "WALKS"), which corresponds to the walks during the intervals of time from 0:00 to 5:04 and from 25:12 to 32:24. The walks section 628 includes performance metric summaries 634, 636 and 638, which show a "STEPS" performance metric (e.g., having the value "1,370"), a "DISTANCE (MI)" performance metric (e.g., having the value "0.76"), and a "DURATION" performance metric (e.g., having the value "12:16"), respectively. Additionally, the updated post-workout screen 600*b* further includes a runs section 630 having an appropriate label (e.g., "RUN"), which corresponds to the runs during the intervals of time from 5:04 to 14:55 and from 17:14 to 25:12. The runs section 630 includes performance metric summaries 640, 642, and 644, which show an "AVG PACE" performance metric (e.g., having the value "8:28"), a "DISTANCE (MI)" performance metric (e.g., having the value "2.19"), and a "MAX PACE" performance metric (e.g., having the value "7:12"), respectively. Finally, the updated post-workout screen 600b further includes a breaks section 632 having an appropriate label (e.g., "BREAKS"), which corresponds to the break during the interval of time from 14:55 to 17:14. The breaks section 632 includes a performance metric summary 646, which show a "DURATION" performance metric (e.g., having the value "2:19"). It is noted that the particular workout depictions displayed on the updated post-workout screen 600b may vary. In some embodiments, the particular workout depictions displayed are customizable by the user. In some embodiments, the particular workout depictions displayed in each section depend on the type of workout.

The process described above for prompting the user regarding a proposed reclassification of the fitness data can be simplified or even eliminated entirely. Particularly, in some embodiments, the processor 37 is configured to reclassify the subset of the fitness data that is associated with the identified time intervals from the data (block 540) without first prompting the user to select whether to reclassify the subset of the fitness data (block 530). In one embodiment, the processor 37 is configured to determine a confidence score regarding whether data associated with a particular time interval should be reclassified and skip the step of prompting the user (block 530) in response to the confidence score exceeding a predetermined threshold.

In at least one embodiment, the health tracking application enables one or more the generated workout depictions described above to be uploaded to a social media platform. Particularly, in one embodiment, the processor 37 is configured to upload the workout depictions and/or the workout data to a third-party server, such as that of a social networking platform (e.g., Facebook, Twitter, Instagram, etc.). Additionally, in some embodiments, the workout data may also be transmitted and/or shared with other users via email or text messaging services. In this way, the workout depictions may be presented to other users on these third-party platforms in a manner analogous to the post-workout screens discussed above. In some embodiments, the processor 37 is configured to generate program instruction, scripts, or the like, which are compatible with the respective third-party platform and configured for presenting the workout depictions in the manner discussed above.

The herein described applications (e.g., the activity tracking application) improve the functioning of the electronic display device 30 and/or activity tracking devices 20, respectively or in combination by enabling it/them to provide easier tracking of workouts comprising multiple activities and present more relevant metrics and analysis of the user's performance. Particularly, if the user wants track only a particular workout of interest (e.g., a run), the methods discussed herein enable the user to simply start tracking the workout before they warm up and stop tracking the workout after cooling down. The methods discussed herein automatically trim away or reclassify any portion of the workout that does not correspond to the workout of interest and provide performance metrics and analysis that appropriately excludes the unrelated fitness data of that was tracked. Additionally, if the user wishes to track multiple different types of workouts during the tracked workout, the methods herein automatically reclassify portions of the workout as necessary and provide performance metrics and analysis that is appropriate and relevant for each individual workout performed during the tracked workout. Devices that are able to automatically trim and reclassify fitness data in this way can operate more efficiently to enable the user to review and analyze the fitness data to better understand his or her performance during the workout.

In another embodiment, a permanent copy of the programming instructions for individual ones of the aforementioned applications (e.g., the activity tracking application) may be placed into permanent storage devices (such as e.g., memory 28 and/or memory 38) during manufacture thereof, or in the field, through e.g., a distribution medium (not shown), such as a compact disc (CD), or through the transmitter/receiver 29 and/or the transmitter/receiver 39 (from a distribution server (not shown)). That is, one or more distribution media having an implementation of the agent program may be employed to distribute the agent and program various computing devices.

The foregoing detailed description of one or more exemplary embodiments of the activity tracking application has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

It will be appreciated that the various ones of the foregoing aspects of the present disclosure, or any parts or functions thereof, may be implemented using hardware, software, firmware, tangible, and non-transitory computer readable or computer usable storage media having instructions stored thereon, or a combination thereof, and may be implemented in one or more computer systems.

What is claimed is:

1. A non-transitory, computer readable medium comprising a plurality of instructions which are configured to, when executed, cause a processor to:
    receive a plurality of data associated to a workout performed by a user, the plurality of data being classified as corresponding to a particular type of workout activity, wherein the data associated to the workout includes first data collected during the particular type of workout activity and second data collected during a pause or a break in the particular type of workout activity;
    process the plurality of data to automatically identify that the second data does not correspond to the particular type of workout activity;
    in response to identifying that the second data does not correspond to the particular type of workout activity, prompt the user to select whether to reclassify the second data;
    reclassify the second data as a second type of activity that is different than the particular type of workout, in response to the user selecting to reclassify the second data, wherein the second type of activity is a pause or a break in the particular type of workout activity that is subsequently resumed such that second data is collected during the workout (i) after collection of the first data and (ii) prior to collection of third data that is collected during the workout following collection of the second data;

generate a first workout depiction including the first data that remains classified as the particular type of workout and excluding the second data that was reclassified as the second type of activity; and provide the first workout depiction to a display device for display to the user.

2. The computer readable medium of claim 1 wherein the particular type of workout activity is one of running, walking, or cycling.

3. The computer readable medium of claim 1 wherein the plurality of instructions are further configured to, when executed, cause the processor to provide a selectable icon to the display device that enables the user to select whether to view the first workout depiction (i) including the first data that remains classified as the first type of workout and excluding the second data that was reclassified as the second type of activity or (ii) including both the first data that remains classified as the first type of workout and the second data that was reclassified as the second type of activity.

4. The computer readable medium of claim 1, wherein:
the processor comprises a processor of a user device;
the user device further comprises the display device configured to provide the display of the first workout depiction and enable user interaction; and
the plurality of data is received from a plurality of health parameter monitoring devices having one or more biometric sensors associated therewith.

5. The computer readable medium of claim 1, wherein a subset of the plurality of data is identified by:
a technique to automatically identify whether a parameter of the second data exceeds or falls below a threshold; or
a technique to automatically identify whether a deviation of the second data from an average of the data is above a threshold.

6. A method of displaying workout data comprising:
receiving a plurality of data associated to a workout performed by a user, the plurality of data being classified as corresponding to a particular type of workout activity, wherein the data associated to the workout includes first data collected during the particular type of workout activity and second data collected during a pause or a break in the particular type of workout activity;
processing the plurality of data and automatically identifying that the second data does not correspond to the particular type of workout activity;
after identifying that the second data does not correspond to the particular type of workout activity, prompting the user to select whether to reclassify the second data;
in response to the user selecting to reclassify the second data, reclassifying the second data as a second type of activity that is different than the particular type of workout, wherein the second type of activity is a pause or a break in the particular type of workout activity that is subsequently resumed such that second data is collected during the workout (i) after collection of the first data and (ii) prior to collection of third data that is collected during the workout following collection of the second data;
generating a first workout depiction including the first data that remains classified as the particular type of workout and excluding the second data that was reclassified as the second type of activity; and
providing the first workout depiction to a display device for display to the user.

7. The method of claim 6 wherein the particular type of workout activity is one of running, walking, or cycling.

8. The method of claim 6 further comprising providing a selectable icon to the display device that enables the user to select whether to view the first workout depiction (i) including the first data that remains classified as the first type of workout and excluding the second data that was reclassified as the second type of activity or (ii) including both the first data that remains classified as the first type of workout and the second data that was reclassified as the second type of activity.

9. The method of claim 6, wherein:
the display device is configured to provide the display of the first workout depiction and enable user interaction; and
the plurality of data is received from a plurality of health parameter monitoring devices having one or more biometric sensors associated therewith.

10. The method of claim 6, wherein the subset of the plurality of data is identified by:
a technique to automatically identify whether a parameter of the second data exceeds or falls below a threshold; or
a technique to automatically identify whether a deviation of the second data from an average of the data is above a threshold.

11. An apparatus for workout editing, the apparatus comprising:
a transceiver apparatus configured to enable communication with at least one health parameter monitoring apparatus;
a user interface configured to provide an interactive display to a user;
a storage entity; and
a processor configured to communicate to the storage entity and the at least one interface, the processor configured to execute at least one health-monitoring application program thereon, the health-monitoring application program comprising a plurality of instructions which are configured to, when executed by the processor, cause the apparatus to:
receive a plurality of data associated to a workout performed by a user, the plurality of data being classified as corresponding to a particular type of workout activity, wherein the data associated to the workout includes first data collected during the particular type of workout activity and second data collected during a pause or a break in the particular type of workout activity;
process the plurality of data to automatically identify that the second data does not correspond to the particular type of workout activity;
in response to identifying that the second data does not correspond to the particular type of workout activity, prompt the user to select on the interactive display whether to reclassify the second data;
in response to the user selecting to reclassify the second data, reclassify the second data as a second type of activity that is different than the particular type of workout, wherein the second type of activity is a pause or a break in the particular type of workout activity that is subsequently resumed such that second data is collected during the workout (i) after collection of the first data and (ii) prior to collection of third data that is collected during the workout following collection of the second data;

generate a first workout depiction including the first data that remains classified as the particular type of workout and excluding the second data that was reclassified as the second type of activity; and provide the first workout depiction to the interactive display.

12. The apparatus of claim 11 wherein the particular type of workout activity is one of running, walking, or cycling.

13. The apparatus of claim 11 wherein the plurality of instructions are further configured to, when executed by the processor, cause the apparatus to provide a selectable icon to the interactive display that enables the user to select whether to view the first workout depiction (i) including the first data that remains classified as the first type of workout and excluding the second data that was reclassified as the second type of activity or (ii) including both the first data that remains classified as the first type of workout and the second data that was reclassified as the second type of activity.

14. The apparatus of claim 11, wherein the plurality of data is received from a plurality of health parameter monitoring devices having one or more biometric sensors associated therewith.

15. The apparatus of claim 11, wherein a subset of the plurality of data is identified by:

a technique to automatically identify whether a parameter of the second data exceeds or falls below a threshold; or a technique to automatically identify whether a deviation of the second data from an average of the data is above a threshold.

* * * * *